US012657896B2

(12) United States Patent
Xu et al.

(10) Patent No.:  US 12,657,896 B2
(45) Date of Patent:  Jun. 16, 2026

(54) PROCESSING APPARATUS AND METHOD AND STORAGE MEDIUM

(71) Applicant: Huawei Technologies Co., Ltd.,
Shenzhen (CN)

(72) Inventors: Hang Xu, Hong Kong (CN); Zhili Liu,
Hong Kong (CN); Fengwei Zhou,
Hong Kong (CN); Jiawei Li, Hong
Kong (CN); Xiaodan Liang,
Guangzhou (CN); Zhenguo Li, Hong
Kong (CN); Li Qian, Shenzhen (CN)

(73) Assignee: **HUAWEI TECHNOLOGIES CO.,
LTD.**, Shenzhen (CN)

( * ) Notice: Subject to any disclaimer, the term of this
patent is extended or adjusted under 35
U.S.C. 154(b) by 500 days.

(21) Appl. No.: 17/880,318

(22) Filed: Aug. 3, 2022

(65) Prior Publication Data

US 2022/0375213 A1   Nov. 24, 2022

Related U.S. Application Data

(63) Continuation of application No.
PCT/CN2021/074993, filed on Feb. 3, 2021.

(30) Foreign Application Priority Data

Feb. 3, 2020   (CN) .......................... 202010079168.1

(51) Int. Cl.
*G06V 10/82* (2022.01)
*G06N 3/063* (2023.01)
(Continued)

(52) U.S. Cl.
CPC ............. *G06V 10/82* (2022.01); *G06N 3/063*
(2013.01); *G06V 10/28* (2022.01); *G06V
10/7715* (2022.01); *G06V 10/7753* (2022.01)

(58) Field of Classification Search
CPC .... G06V 10/82; G06V 10/28; G06V 10/7715;
G06V 10/7753; G06V 10/95;
(Continued)

(56) References Cited

U.S. PATENT DOCUMENTS 9,946,960 B1 *   4/2018   Kim ....................... G06N 3/045
10,198,671 B1    2/2019   Yang et al.
(Continued)

FOREIGN PATENT DOCUMENTS

CN      109299296 A  *  2/2019
CN      109949316 A  *  6/2019
(Continued)

OTHER PUBLICATIONS

University of Windsor (Year: 2019).*
The Visual Computer (Year: 2019).*
Girshick, R, et al., Fast R-CNN, Apr. 30, 2015, 9 pages.
Xu, Q., et al., Occlusion Problem-Oriented Adversarial Faster-RCNN Scheme, Oct. 31, 2019, 12 pages.
(Continued)

*Primary Examiner* — Huo Long Chen
(74) *Attorney, Agent, or Firm* — Conley Rose, P.C.

(57) ABSTRACT

A processing apparatus includes a collection module and a training module, the training module includes a backbone network and a region proposal network (RPN) layer, the backbone network is connected to the RPN layer, and the RPN layer includes a class activation map (CAM) unit. The collection module is configured to obtain an image, where the image includes an image with an instance-level label and an image with an image-level label. The backbone network is used to output a feature map of the image based on the image obtained by the collection module.

25 Claims, 10 Drawing Sheets

(51) Int. Cl.
    *G06V 10/28*         (2022.01)
    *G06V 10/77*         (2022.01)
    *G06V 10/774*       (2022.01)

(58) Field of Classification Search
    CPC .... G06V 10/25; G06V 10/454; G06V 10/774;
            G06V 10/84; G06V 20/00; G06N 3/063;
            G06N 3/042; G06N 3/0464; G06N 3/084;
            G06N 3/09; G06N 3/045; G06F 18/241
    See application file for complete search history.

(56)            References Cited

U.S. PATENT DOCUMENTS

| | | | |
|---|---|---|---|
| 2019/0147245 A1 | 5/2019 | Qi et al. | |
| 2021/0027098 A1* | 1/2021 | Ge ........................ | G06F 18/217 |

FOREIGN PATENT DOCUMENTS

| | | | | |
|---|---|---|---|---|
| CN | 110008962 A | | 7/2019 | |
| CN | 110084313 A | | 8/2019 | |
| CN | 110176001 A | | 8/2019 | |
| CN | 110298262 A | | 10/2019 | |
| CN | 110348437 A | | 10/2019 | |
| CN | 110378381 A | | 10/2019 | |
| CN | 110716792 A | * | 1/2020 | ............... G06F 9/46 |
| CN | 111291809 A | | 6/2020 | |
| KR | 20180065856 A | * | 6/2018 | |

OTHER PUBLICATIONS

Yan, Z., et al., Weakly- and Semi-Supervised Object Detection with Expectation-Maximization Algorithm, Feb. 28, 2017, 9 pages.
Li F, Fergus R, Perona P. "One-shot learning of object categories," TPAMI, 2006, vol. 28, No. 4, 18 pages.
"Heartexlabs /labellmg," Dec. 2018, 5 pages, https://github.com/heartexlabs/labellmg.
Lin hongsheng, "Multi-target Detection technology in Infrared ImageBased on Transfer Learning," Jul. 2019, 9 pages.
Yongqiang Zhang et al, "W2F: A Weakly-Supervised to Fully-Supervised Framework for Object Detection," 2018, 9 pages.
Shaoqing Ren et al, "Faster R-CNN: Towards Real-Time Object Detection with Region Proposal Networks," Jan. 6, 2016, 14 pages.
Dvornik, N., et al, "Modeling visual context is key to augmenting object detection datasets," In Proceedings of the European Conference on Computer Vision (ECCV), 2018, 17 pages.
Adithya Subramania, "One-Click Annotation with Guided Hierarchical Object Detection," Oct. 2018, 13 pages.
Pardo A, et al, "BAOD: Budget-Aware Object Detection," arXiv preprint arXiv:1904.05443, 2019, 23 pages.
Ali Diba et al., "Weakly Supervised Cascaded Convolutional Networks," Jul. 21-26, 2017, 9 pages.
Krasin I., et al., "A public dataset for large-scale multi-label and multi-class image classification," 2017, 15 pages.
Weifeng GE et al:"Weakly Supervised Complementary Parts Models for Fine-Grained Image Classification from the Bottom Up", Mar. 7, 2019, XP081130503, total 11 pages.

* cited by examiner

System architecture 100

PROCESSING APPARATUS AND METHOD AND STORAGE MEDIUM

CROSS-REFERENCE TO RELATED APPLICATIONS

This is a continuation of International Patent Application No. PCT/CN2021/074993 filed on Feb. 3, 2021, which claims priority to Chinese Patent Application No. 202010079168.1 filed on Feb. 3, 2020. The disclosures of the aforementioned applications are hereby incorporated by reference in their entireties.

TECHNICAL FIELD

This disclosure relates to the field of computer vision, and in particular, to a processing apparatus and method and a storage medium.

BACKGROUND

Artificial intelligence (AI) is a theory, a method, a technology, and an application system that simulate, extend, and expand human intelligence by using a digital computer or a machine controlled by a digital computer, sense the environment, obtain knowledge, and use the knowledge to obtain a best result. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions. Researches in the field of artificial intelligence include robot, natural language processing, computer vision, decision-making and inference, human-computer interaction, recommendation and search, AI fundamentals, and the like.

Object detection is a basic computer vision task that can recognize a location and a class of an object in an image. During actual application, researchers and engineers create datasets for different specific problems based on different application scenarios and actual task requirements, to train highly customized and unique automatic object detectors. The automatic object detector is widely applied to scenarios such as self-driving vehicles, surveillance cameras, and mobile phones.

SUMMARY

There are prominent differences usually exist between different detection targets and different datasets, and new problems are difficult to be resolved by using previous datasets. When new training data is collected, data with an instance-level label of a manually annotated bounding box of an object in an image is usually required. However, training a high-performance object detection model requires a large amount of training data, and this is costly. Therefore, how to use a small amount of data with instance-level labels to train a high-performance object detection model urgently needs to be resolved.

This disclosure provides a processing apparatus and method and a storage medium, to use a small quantity of images with instance-level labels to train a high-performance object detection model.

According to a first aspect, this disclosure provides a processing apparatus. The processing apparatus may include a collection module and a training module. The training module may include a backbone network and a region proposal network (RPN) layer, the backbone network is connected to the RPN layer, and the RPN layer may include a class activation map (CAM) unit. The collection module is configured to obtain an image, where the image may include an image with an instance-level label and an image with an image-level label. Data with an image-level label is also referred to as an image with an image-level label in this disclosure, the image with an image-level label only requires one or more labels of an image, and a specific bounding box of an object does not need to be drawn. Data with an instance-level label is also referred to as an image with an instance-level label in this disclosure, the image with an instance-level label requires both a class label and a bounding box of an object that is used to locate a location of a target object in an image. The backbone network is used to output a feature map of the image based on the image obtained by the collection module. The RPN layer is used to determine a proposal region of the image based on the feature map. The RPN layer is further used to determine, by using the CAM unit, a CAM corresponding to the proposal region, and determine, based on the CAM, a probability that the proposal region belongs to a foreground.

The technical solutions provided in this disclosure may be applied to a large-scale object detection scenario, including but not limited to the following scenarios.

Recognition of everything by a mobile phone:

A camera on the mobile phone may be used to take a picture that includes various things. After the picture is obtained, a location and a class of each object in the picture can be determined by performing object detection on the picture.

Object detection can be performed, by using an object detection model obtained by the processing apparatus provided in this disclosure, on the picture taken by the mobile phone. Because the CAM unit is newly added to the processing apparatus provided in this embodiment of this disclosure, a large quantity of images with instance-level labels do not need to be used for training in an object detection model training phase. Therefore, the solution provided in this disclosure can achieve good object detection effect and reduce costs.

Street View Recognition:

A camera deployed on a roadside may take a picture of oncoming vehicles and people. After the picture is obtained, the picture may be uploaded to a control center device. The control center device performs object detection on the picture to obtain an object detection result. When there is an abnormal object, the control center may give an alarm.

Object Detection Model Training Solution Based on a Cloud Computing Platform:

In this scenario, training of an object detection model is deployed on the cloud computing platform, and the object detection model is trained based on a dataset provided by a user. Many cloud computing platforms have object detection model training solutions that passively depend on a large quantity of images with instance-level labels uploaded by users. For individuals and small- and medium-sized enterprises, collecting a large quantity of images with instance-level labels is costly. Therefore, a small amount of data with instance-level labels may train a high-performance object detection model by using the method provided in this disclosure.

Optionally, with reference to the first aspect, in a first possible implementation, the collection module is further configured to receive the image with an instance-level label, where the image with an instance-level label may include a class label, and obtain the image with an image-level label based on the class label.

Optionally, with reference to the first aspect or the first possible implementation of the first aspect, in a second possible implementation, the CAM indicates a CAM response intensity corresponding to the proposal region, and the RPN layer is further used to determine, based on the CAM response intensity corresponding to the proposal region, the probability that the proposal region belongs to the foreground, where the CAM response intensity corresponding to the proposal region is directly proportional to the probability that the proposal region belongs to the foreground.

Optionally, with reference to the first aspect or the first possible implementation of the first aspect, in a third possible implementation, the CAM indicates a CAM response intensity corresponding to the proposal region, and the RPN layer is further used to determine a confidence of the proposal region, and determine, based on a weighted sum of the confidence and the CAM response intensity, a probability that the proposal region is used as the foreground.

Optionally, with reference to the first aspect or the first to the third possible implementations of the first aspect, in a fourth possible implementation, the processing apparatus may further include N heads, N is a positive integer, the head is connected to the RPN layer, and any one of the N heads is used to determine multiple instance detection (MID) losses of the image with an instance-level label and the image with an image-level label based on a feature of the proposal region, where the feature of the proposal region is a feature that corresponds to the proposal region and that is determined by the RPN layer based on the probability, and backpropagate the MID losses to the RPN layer and the backbone network, where the MID loss is used to determine a parameter of the training module.

Optionally, with reference to the fourth possible implementation of the first aspect, in a fifth possible implementation, the N heads are connected in series.

Optionally, with reference to the fourth or the fifth possible implementation of the first aspect, in a sixth possible implementation, the RPN layer is used to calculate CAM losses of the image with an instance-level label and the image with an image-level label, and backpropagate the CAM losses and the MID losses to the RPN layer and the backbone network, where the CAM loss is used to determine the parameter of the training module.

Optionally, with reference to the fifth possible implementation of the first aspect, in a seventh possible implementation, the RPN layer is further used to calculate an RPN loss of the image with an instance-level label. The head is further used to calculate a proposal loss, a classification loss, and a regression loss of the image with an instance-level label, and backpropagate the CAM losses, the MID losses, the proposal loss, the classification loss, and the regression loss, where the RPN loss, the proposal loss, the classification loss, and the regression loss are used to determine the parameter of the training module.

Optionally, with reference to the first to the sixth possible implementations of the first aspect, in an eighth possible implementation, the processing apparatus is a cloud server.

According to a second aspect, this disclosure provides an object detection apparatus. The object detection apparatus may include a backbone network and a RPN layer, the backbone network is connected to the RPN layer, and the RPN layer may include a CAM unit. The backbone network is used to receive a to-be-detected image, and output a feature map of the to-be-detected image. The RPN layer is used to determine a proposal region of the to-be-detected image based on the feature map, and determine, by using the CAM unit, a CAM corresponding to the proposal region. The RPN layer is further used to determine, based on the CAM, a probability that the proposal region belongs to a foreground.

Optionally, with reference to the second aspect, in a first possible implementation, the CAM indicates a CAM response intensity of the proposal region, and the RPN layer is further used to determine, based on the CAM response intensity of the proposal region, the probability that the proposal region belongs to the foreground, where the CAM response intensity of the proposal region is directly proportional to the probability that the proposal region belongs to the foreground.

Optionally, with reference to the second aspect, in a second possible implementation, the CAM indicates a CAM response intensity of the proposal region, and the RPN layer is further used to determine, based on a weighted sum of a confidence of the proposal region and the CAM response intensity, a probability that the proposal region is used as the foreground.

Optionally, with reference to the second aspect or the first or the second possible implementations of the second aspect, in a third possible implementation, the object detection apparatus further includes N heads, N is a positive integer, the head is connected to the RPN layer, and any one of the N heads is used to output a detection result based on the probability that the proposal region is used as the foreground, where the detection result includes a class and a bounding box of an object.

Optionally, with reference to the third possible implementation of the second aspect, in a fourth possible implementation, the N heads are connected in series.

According to a third aspect, this disclosure provides a processing method, including obtaining an image, where the image may include an image with an instance-level label and an image with an image-level label, the image with an instance-level label includes a class label and a bounding box of an object, and the image with an image-level label includes the class label, outputting a feature map of the image based on the image obtained by the collection module, determining a proposal region of the image based on the feature map, and determining a CAM corresponding to the proposal region, and determining, based on the CAM, a probability that the proposal region belongs to a foreground.

Optionally, with reference to the third aspect, in a first possible implementation, obtaining an image further includes receiving the image with an instance-level label, and obtaining the image with an image-level label based on the class label included in the image with an instance-level label.

Optionally, with reference to the third aspect or the first possible implementation of the third aspect, in a second possible implementation, the CAM indicates a CAM response intensity corresponding to the proposal region, and determining, based on the CAM, a probability that the proposal region belongs to a foreground includes determining, based on the CAM response intensity corresponding to the proposal region, the probability that the proposal region belongs to the foreground, where the CAM response intensity corresponding to the proposal region is directly proportional to the probability that the proposal region belongs to the foreground.

Optionally, with reference to the third aspect or the first possible implementation of the third aspect, in a third possible implementation, the CAM indicates a CAM response intensity corresponding to the proposal region, and determining, based on the CAM, a probability that the proposal region belongs to a foreground includes determining a confidence of the proposal region, and determining, based on a weighted sum of the confidence and the CAM response intensity, a probability that the proposal region is used as the foreground.

Optionally, with reference to the third aspect or the first to the third possible implementations of the third aspect, in a fourth possible implementation, the method may further include determining MID losses of the image with an instance-level label and the image with an image-level label based on a feature of the proposal region, where the feature of the proposal region is a feature that corresponds to the proposal region and that is determined by the RPN layer based on the probability, and propagating the MID losses to the RPN layer and the backbone network, where the MID loss is used to determine a parameter of a training model.

Optionally, with reference to the fourth possible implementation of the third aspect, in a fifth possible implementation, the method may further include calculating CAM losses of the image with an instance-level label and the image with an image-level label. The CAM loss is used to determine the parameter of the training module.

Optionally, with reference to the fifth possible implementation of the third aspect, in a sixth possible implementation, the method may further include calculating a proposal loss, a classification loss, and a regression loss of the image with an instance-level label. An RPN loss, the proposal loss, the classification loss, and the regression loss are used to determine the parameter of the training module.

According to a fourth aspect, this disclosure provides an object detection method, including receiving a to-be-detected image, and outputting a feature map of the to-be-detected image, determining a proposal region of the to-be-detected image based on the feature map, and determining a CAM corresponding to the proposal region, and determining, based on the CAM, a probability that the proposal region belongs to a foreground.

Optionally, with reference to the fourth aspect, in a first possible implementation, the CAM indicates a CAM response intensity of the proposal region, and an RPN layer is further used to determine, based on the CAM response intensity of the proposal region, the probability that the proposal region belongs to the foreground, where the CAM response intensity of the proposal region is directly proportional to the probability that the proposal region belongs to the foreground.

Optionally, with reference to the fourth aspect, in a second possible implementation, the CAM indicates a CAM response intensity of the proposal region, and an RPN layer is further used to determine, based on a weighted sum of a confidence of the proposal region and the CAM response intensity, a probability that the proposal region is used as the foreground.

Optionally, with reference to the fourth aspect or the first or the second possible implementation of the fourth aspect, in a third possible implementation, the method further includes outputting a detection result based on the probability that the proposal region is used as the foreground, where the detection result includes a class and a bounding box of an object.

According to a fifth aspect, this disclosure provides a process apparatus. The apparatus includes a memory configured to store a program, and a processor configured to execute the program stored in the memory. When executing the program stored in the memory, the processor is configured to perform the method in the third aspect.

According to a sixth aspect, this disclosure provides an object detection apparatus. The apparatus includes a memory configured to store a program, and a processor configured to execute the program stored in the memory. When executing the program stored in the memory, the processor is configured to perform the method in the fourth aspect.

According to a seventh aspect, this disclosure provides an electronic device. The electronic device includes the processing apparatus or the cloud server in the first aspect or the third aspect.

According to an eighth aspect, this disclosure provides an electronic device. The electronic device includes the object detection apparatus in the second aspect or the fourth aspect.

The electronic device may further be a mobile terminal (for example, a smartphone), a tablet computer, a notebook computer, an augmented reality/virtual reality device, a vehicle-mounted terminal device, or the like.

According to a ninth aspect, this disclosure provides a computer storage medium. The computer storage medium stores program code, and the program code includes instructions used to perform steps in the method in the third aspect.

According to a tenth aspect, this disclosure provides a computer program product including instructions. When the computer program product is run on a computer, the computer is enabled to perform steps in the method in the fourth aspect.

According to an eleventh aspect, this disclosure provides a chip. The chip includes a processor and a data interface, and the processor reads, through the data interface, instructions stored in a memory, to perform the method in the third aspect.

According to a twelfth aspect, this disclosure provides a chip. The chip includes a processor and a data interface, and the processor reads, through the data interface, instructions stored in a memory, to perform the method in the fourth aspect.

Optionally, in an implementation, the chip may further include the memory. The memory stores the instructions, the processor is configured to execute the instructions stored in the memory, and when executing the instructions, the processor is configured to perform the method in the first aspect. The chip may further be a field-programmable gate array (FPGA) or an application-specific integrated circuit (ASIC).

In the technical solution provided in this disclosure, the CAM unit is added, to obtain a probability that the proposal region belongs to a class of an object. Therefore, in the solution provided in this disclosure, both the image with an instance-level label and the image with an image-level label may be used for training, to obtain a high-performance object detection model.

DESCRIPTION OF EMBODIMENTS

Figure 1:
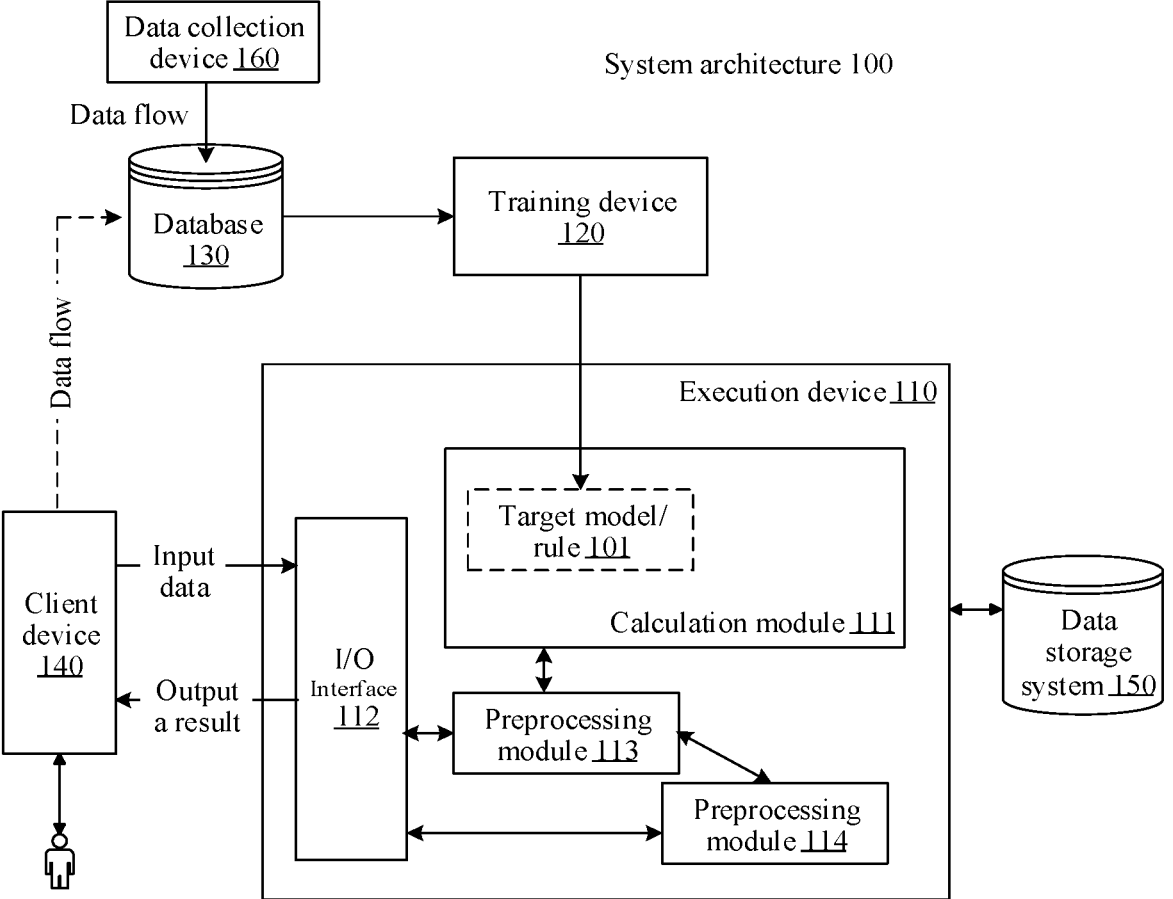
FIG. 1 is a schematic diagram of a system architecture according to an embodiment of this disclosure.

The following clearly and completely describes technical solutions in embodiments of this disclosure with reference to the accompanying drawings in embodiments of this disclosure. It is clear that the described embodiments are merely some but not all of embodiments of this disclosure.

It should be noted that, in the specification, claims, and accompanying drawings of this disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of this disclosure are mainly applied to large-scale object detection scenarios, for example, facial recognition of a mobile phone, recognition of everything by a mobile phone, a perception system of an uncrewed vehicle, a security camera, object recognition of a photo on a social website, and an intelligent robot. The following describes several typical application scenarios.

Recognition of Everything by a Mobile Phone:

A camera on the mobile phone may be used to take a picture that includes various things. After the picture is obtained, a location and a class of each object in the picture can be determined by performing object detection on the picture.

Object detection can be performed, by using an object detection model obtained by a processing apparatus provided in embodiments of this disclosure, on the picture taken by the mobile phone. Because the CAM unit is newly added to the processing apparatus provided in embodiments of this disclosure, a large quantity of images with instance-level labels do not need to be used for training in an object detection model training phase in embodiments of this disclosure. Therefore, the solution provided in this disclosure can achieve good object detection effect and reduce costs.

Street View Recognition:

A camera deployed on a roadside may take a picture of oncoming vehicles and people. After the picture is obtained, the picture may be uploaded to a control center device. The control center device performs object detection on the picture to obtain an object detection result. When there is an abnormal object, the control center may give an alarm.

Object Detection Model Training Solution Based on a Cloud Computing Platform:

In this scenario, training of an object detection model is deployed on the cloud computing platform, and the object detection model is trained based on a dataset provided by a user. Many cloud computing platforms have object detection model training solutions that passively depend on a large quantity of images with instance-level labels uploaded by users. For individuals and small- and medium-sized enterprises, collecting a large quantity of image with instance-level labels is costly. Therefore, a small amount of data with instance-level labels may train a high-performance object detection model by using a method provided in embodiments of this disclosure.

In the large-scale object detection scenarios mentioned above, due to prominent appearance differences between different objects and differences in scenario factors such as a background and light, an existing large dataset cannot be directly used to train a detection model for a new problem. Only a small amount of instance-level label training data cannot cover complex actual situations. Consequently, performance of a trained model is poor. A large amount of data with instance-level labels is used for training, and data collection costs are high. If only data with an image-level label is used for training, an instance of each training image cannot be accurately located, and performance cannot meet an actual requirement. Therefore, it is difficult to achieve satisfactory precision when only a small amount of data with instance-level labels or only a large amount of data with image-level labels is separately used to train a model in existing mainstream object detection. However, in an existing method of combining two types of data, a user needs to additionally search for data with an image-level label. In addition, this solution is based on a multi-step iteration algorithm, and cannot perform end-to-end training. End-to-end means from an input end to an output end, that is, original data is input and a result is output, where a neural network (or a black box) is self-integrated. Performance of this solution depends on hyperparameter setting and an initial value in an annotation estimation step. Usually, experts need to participate in design to achieve expected performance, which causes difficulties during actual application.

To resolve the foregoing problem, this disclosure provides a processing apparatus and method. The following describes, from a model training side and a model application side, the method provided in this disclosure.

The processing method provided in embodiments of this disclosure is a neural network training method, relates to computer vision processing, and may further be applied to data processing methods such as data training, machine learning, and deep learning. Symbolized and formalized intelligent information modeling, extraction, preprocessing, training, and the like are performed on training data (for example, an image with an instance-level label and an image with an image-level label in this disclosure), to finally obtain a trained neural network.

In an object detection method provided in embodiments of this disclosure, input data (a to-be-detected image) may be input into the trained neural network, and output data (for example, a detection result of the image in this disclosure) is obtained by using the foregoing trained neural network. It should be noted that the processing method and the object detection method provided in embodiments of this disclosure are disclosures generated based on a same concept, or may be understood as two parts of a system or two phases of an entire process, for example, a model training phase and a model application phase.

Because embodiments of this disclosure relate to massive application of a neural network, for ease of understanding, the following first describes terms and concepts related to the neural network in embodiments of this disclosure.

(1) Neural Network:

The neural network may include a neuron. The neuron may be an operation unit that uses xs and an intercept of 1 as an input. An output of the operation unit may be as follows:

$$h_{W,b}(x) = f(W^T x) = f\left(\sum_{s=1}^{n} W_s x_s + b\right),$$

where s=1, 2, . . . , or n, n is a natural number greater than 1, $W_s$ is a weight of $x_s$, and b is bias of the neuron. f is an activation function (activation function) of the neuron, used to introduce a non-linear feature into the neural network, to convert an input signal in the neuron into an output signal. The output signal of the activation function may serve as an input of a next convolution layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network:

The deep neural network (DNN) may be understood as a neural network with a plurality of hidden layers. There is no special metric standard for "a plurality of" herein. A multi-layer neural network and the deep neural network are essentially the same. The DNN is divided based on locations of different layers, and a neural network in the DNN may be divided into three types: an input layer, a hidden layer, and an output layer. Usually, a first layer is the input layer, a last layer is the output layer, and a middle layer is the hidden layer. Layers are fully connected. To be specific, any neuron at an $i^{th}$ layer is necessarily connected to any neuron at an $(i+1)^{th}$ layer. Although the DNN seems complex, the DNN is actually not complex in terms of work at each layer, and is simply represented as the following linear relationship expression: $y'=a(Wx'+b)$, where $\vec{x}$ is an input vector, $\vec{y}$ is an output vector, $\vec{b}$ is a bias vector, W is a weight matrix (which is also referred to as a coefficient), and a( ) is an activation function. At each layer, the output vector $\vec{y}$ is obtained by performing such a simple operation on the input vector $\vec{x}$. Because there is a plurality of layers in the DNN, there are also a plurality of coefficients W and a plurality of bias vectors $\vec{b}$. Therefore, the parameters in the DNN are further defined as follows. First, the coefficient W is defined as follows. A DNN including three layers is used as an example. A linear coefficient from a fourth neuron at a second layer to a second neuron at a third layer is defined as $$w_{24}^3$$

The superscript 3 indicates a layer at which the coefficient $\underline{W}$ is located, and the subscript corresponds to an output third-layer index 2 and an input second-layer index 4. In conclusion, a coefficient from a $k^{th}$ neuron at an $(L-1)^{th}$ layer to a $j^{th}$ neuron at an Lth layer is defined as $$w_{jk}^L$$

It should be noted that there is no parameter $\underline{W}$ at the input layer. In the deep neural network, more hidden layers make the network more capable of describing a complex case in the real world. Theoretically, a model with more parameters has higher complexity and a larger "capacity". It indicates that the model can complete a more complex learning task.

(3) CNN:

The CNN is a deep neural network with a convolutional architecture. The CNN includes a feature extractor including a convolution layer and a sub-sampling layer, and the feature extractor may be considered as a filter. The convolutional layer is a neuron layer that is in the CNN and at which convolution processing is performed on an input signal. At the convolutional layer of the CNN, one neuron may be connected to only a part of neurons at a neighboring layer. A onvolutional layer usually includes several feature planes, and each feature plane may include some neurons arranged in a rectangle. Neurons of a same feature plane share a weight, and the shared weight herein is a convolution kernel. Sharing a weight may be understood as that a manner of extracting image information is unrelated to a location. The convolution kernel may be initialized in a form of a matrix of a random size. In a training process of the CNN, an appropriate weight may be obtained for the convolution kernel through learning. In addition, sharing the weight has advantages that connections between layers of the CNN are reduced, and a risk of overfitting is reduced.

(4) Classifier:

Many neural network structures have a classifier at the end to classify an object in an image. The classifier usually includes a fully-connected layer and a softmax function, and can output probabilities of different classes based on inputs.

(5) Feature Pyramid Network (FPN):

Originally, most object detection algorithms use only top-layer features for prediction. However, at a lower layer, feature semantic information is less, but a target location is accurate. At a higher layer, feature semantic information is rich, but a target location is rough. In the FPN, independent prediction is performed on different feature layers based on an original detector.

(6) Loss Function:

In a process of training a neural network, because it is expected that an output of the neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the neural network). For example, if the predicted value of the network is large, the weight vector is adjusted to lower the predicted value until the neural network can predict the target value that is actually expected or a value close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(7) Graph Convolutional Network:

A graph is a data format that may be used to indicate a social network, a communication network, a protein molecular network, or the like. A node in the graph indicates an individual in a network, and a connection line indicates a connection relationship between individuals. A plurality of machine learning tasks such as community detection and link prediction need to use graph structure data. Therefore, emergence of the graph convolutional network (GCN) provides a new idea for resolving these problems. Deep learning can be performed on graph data by using the GCN.

The GCN is a natural extension of a CNN in a graph domain. The GCN can simultaneously perform peer-to-peer learning on node feature information and structure information, and is currently an optimal choice for a graph data learning task. The GCN has extremely broad applicability, and is applicable to a node and a graph of any topological structure.

(8) Back Propagation Algorithm:

A neural network may use an error back propagation (BP) algorithm to correct a value of a parameter in an initial super-resolution model in a training process, so that a reconstruction error loss of the super-resolution model becomes smaller. Further, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

(9) RPN:

The RPN is a part of a current mainstream object detection neural network framework. An object detection neural network usually includes four parts: a backbone network, a feature pyramid network, the RPN, and a detection head network (head). A main function of the RPN is to select a region with a high probability of belonging to a foreground from a large quantity of proposal regions. Further, for each proposal region, the RPN calculates, based on a feature map output by the feature pyramid network, a probability that the proposal region is used as a foreground, and then searches all proposal regions for a prominent region with a high probability as a preliminary result and outputs the preliminary result to the detection head. The RPN is a small classification network of two classes (distinguishing a foreground and a background). In a training process, an average difference between a real object region (instance-level annotation) and the output prominent region is usually calculated as a loss function, and the loss function is minimized to assist in training the network.

(10) Head:

The head is a part of the current mainstream object detection neural network framework, and is mainly used to further select a prediction region from the prominent region and determine a corresponding object (class label) in the prediction region. To achieve higher accuracy than the RPN, the head is usually complex, and includes structures such as a convolutional layer and a fully-connected layer. In addition, the head may have a plurality of different loss functions, and even a multi-level serial connection structure (a plurality of detection head networks are stacked and connected in series).

(11) Data With an Instance-Level Label and Data With an Image-Level Label:

The data with an image-level label is also referred to as an image with an image-level label in this disclosure. For the image with an image-level label, only one or more labels of an image are required, and a specific bounding box of an object does not need to be drawn. The data with an instance-level label is also referred to as an image with an instance-level label in this disclosure, the image with an instance-level label requires both a class label and a bounding box of an object used to locate a location of a target object in an image.

The following describes in detail a system architecture in an embodiment of this disclosure with reference to FIG. 1.

FIG. 1 is a schematic diagram of a system architecture according to an embodiment of this disclosure. As shown in FIG. 1, a system architecture 100 includes an execution device 110, a training device 120, a database 130, a client device 140, a data storage system 150, and a data collection device 160.

In addition, the execution device 110 includes a computing module 111, an input/output (I/O) interface 112, a preprocessing module 113, and a preprocessing module 114. The computing module 111 may include a target model/rule 101. The preprocessing module 113 and the preprocessing module 114 are optional.

The data collection device 160 is configured to collect training data (the data collection device 160 may be understood as a collection module in the solution provided in this disclosure). For the solution provided in embodiments of this disclosure, the training data may include an image with an instance-level label and an image with an image-level label. An annotation result of the image with an instance-level label may be a classification result of each to-be-detected object in a (manually) pre-annotated training image, and the image with an image-level label may be obtained through automatic searching based on a class label of the image with an instance-level label. After collecting the training data, the data collection device 160 stores the training data in the database 130, and the training device 120 obtains the target model/rule 101 (the target module/rule 101 is the foregoing model obtained through training in the training phase) through training based on the training data maintained in the database 130.

The following describes a process in which the training device 120 obtains the target model/rule 101 based on the training data. The training device 120 performs object detection on an input training image, and compares an output detection result with a pre-labeled object detection result, until a difference between the object detection result output by the training device 120 and the pre-labeled detection result is less than a specific threshold, thereby completing training of the target model/rule 101.

The target model/rule 101 may be configured to implement an object detection method provided in embodiments of this disclosure. In other words, a to-be-detected image (which is preprocessed) is input to the target module/rule 101, to obtain a detection result of the to-be-detected image. The target model/rule 101 may further be a CNN. It should be noted that, during actual application, the training data maintained in the database 130 is not necessarily all collected by the data collection device 160, and may be received from another device. It should further be noted that the training device 120 may not necessarily train the target model/rule 101 completely based on the training data maintained in the database 130, or may obtain training data from a cloud or another place to perform model training. The foregoing descriptions should not be construed as a limitation on embodiments of this disclosure.

The target model/rule 101 obtained through training by the training device 120 may be applied to different systems or devices, for example, the execution device 110 shown in FIG. 1. The execution device 110 may be a terminal, for example, a mobile phone terminal, a tablet computer, a laptop computer, augmented reality (AR)/virtual reality (VR), or a vehicle-mounted terminal, or may be a server, a cloud, or the like. In FIG. 1, the execution device 110 configures the I/O interface 112 configured to exchange data with an external device. A user may input data to the I/O interface 112 by using the client device 140, where the input data in this embodiment of this disclosure may include a to-be-processed image input by the client device. The client device 140 herein may further be a terminal device.

The preprocessing module 113 and the preprocessing module 114 are configured to perform preprocessing based on the input data (for example, the to-be-processed image) received by the I/O interface 112. In this embodiment of this disclosure, the preprocessing module 113 and the preprocessing module 114 may not exist (or only one of the preprocessing module 113 and the preprocessing module 114 exists). The computing module 111 is directly configured to process the input data.

In a process in which the execution device 110 preprocesses the input data, or in a process in which the computing module 111 of the execution device 110 performs computing, the execution device 110 may invoke data, code, and the like in the data storage system 150 for corresponding processing, and may further store, in the data storage system 150, data, an instruction, and the like that are obtained through the corresponding processing.

Finally, the I/O interface 112 returns a processing result, such as the foregoing obtained object detection result, to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a required result for the user.

In a case shown in FIG. 1, the user may manually provide the input data. The manually providing may be performed by using a screen provided on the I/O interface 112. In another case, the client device 140 may automatically send the input data to the I/O interface 112. If it is required that the client device 140 needs to obtain authorization from the user to automatically send the input data, the user may set corresponding permission on the client device 140. The user may check, on the client device 140, a result output by the execution device 110. Further, the result may be presented in a form of display, sound, an action, or the like. The client device 140 may also serve as a data collector to collect, as new sample data, the input data that is input to the I/O interface 112 and an output result that is output from the I/O interface 112 shown in the figure, and store the new sample data in the database 130. Certainly, the client device 140 may alternatively not perform collection. Instead, the I/O interface 112 directly stores, in the database 130 as new sample data, the input data that is input to the I/O interface 112 and the output result that is output from the I/O interface 112 in the figure.

It should be noted that FIG. 1 is merely a schematic diagram of a system architecture according to an embodiment of this disclosure. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As described in the foregoing basic concepts, a CNN is a deep neural network with a convolutional architecture, and is a deep learning architecture. In the deep learning architecture, multi-layer learning is performed at different abstract levels by using a machine learning algorithm. As a deep learning architecture, the CNN is a feed-forward artificial neural network. Neurons in the feed-forward artificial neural network may respond to an input image.

Figure 2:
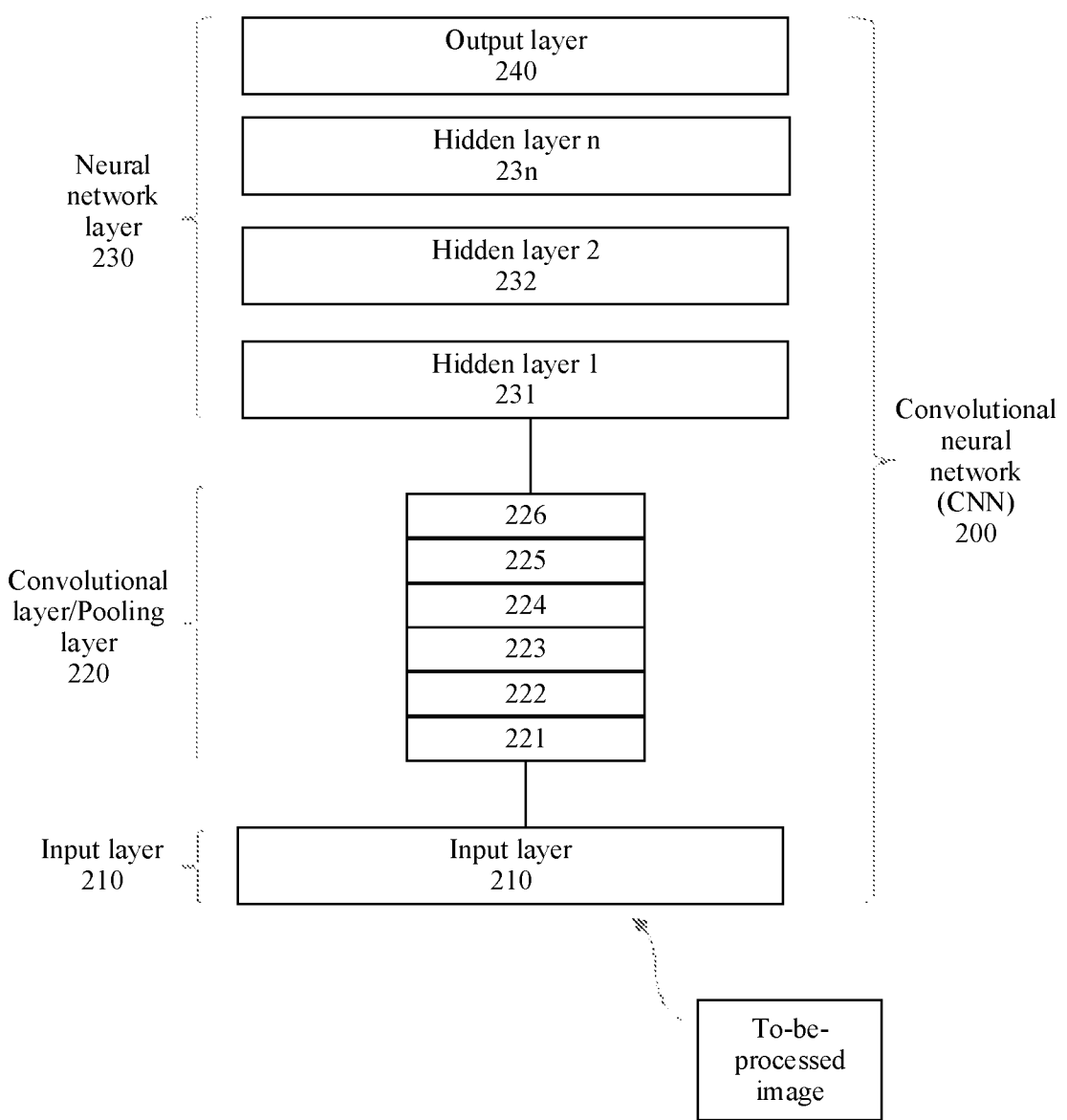
FIG. 2 is a schematic diagram of performing object detection by using a convolutional neural network (CNN) model according to an embodiment of this disclosure.

As shown in FIG. 2, a CNN 200 may include an input layer 210, a convolutional layer/pooling layer 220 (the pooling layer is optional), and a neural network layer 230. The following describes the layers in detail.

Convolutional Layer/Pooling Layer 220:

Convolutional Layer:

As shown in FIG. 2, the convolutional layers/pooling layers 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the 223 layer is a pooling layer, the layers 224 and 225 are convolutional layers, and the layer 226 is a pooling layer. In other words, an output of a convolutional layer may be used as an input for a subsequent pooling layer, or may be used as an input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. During image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride) in a horizontal direction on an input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality". Different weight matrices may be used for extracting different features from the image. For example, one weight matrix is used for extracting edge information of the image, another weight matrix is used for extracting a specific color of the image, and a further weight matrix is used for blurring unneeded noise in the image. The plurality of weight matrices have the same size (rows×columns), and convolutional feature maps extracted from the plurality of weight matrices with the same size have a same size. Then, the plurality of extracted convolutional feature maps with the same size are combined to form an output of the convolution operation.

Weight values in these weight matrices need to be obtained through a lot of training during actual application. Each weight matrix formed by using the weight values obtained through training may be used for extracting information from an input image, to enable the CNN 200 to perform correct prediction.

When the CNN 200 has a plurality of convolutional layers, a large quantity of general features are usually extracted at an initial convolutional layer (for example, 221). The general feature may also be referred to as a low-level feature. As the depth of the CNN 200 increases, a feature extracted at a subsequent convolutional layer (for example, 226) becomes more complex, for example, a high-level semantic feature. A feature with higher semantics is more applicable to a to-be-resolved problem.

Pooling Layer:

Because a quantity of training parameters usually needs to be reduced, pooling layers usually need to be periodically introduced after the convolution layers. For the layers 221 to 226 of the convolution layers/pooling layers 220 in FIG. 2, there may be one pooling layer following one convolution layer, or one or more pooling layers following a plurality of convolution layers. During image processing, the pooling layer is only used to reduce a space size of the image. The pooling layer may include an average pooling operator and/or a maximum pooling operator, to perform sampling on the input image to obtain an image with a small size. The average pooling operator may be used for calculating pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 230:

After processing is performed by the convolutional layer/pooling layer 220, the CNN 200 still cannot output required output information. As described above, at the convolutional layer/pooling layer 220, only a feature is extracted, and parameters resulting from an input image are reduced. However, to generate final output information (required class information or other related information), the CNN 200 needs to use the neural network layer 230 to generate an output of one required class or outputs of a group of required classes. Therefore, the neural network layer 230 may include a plurality of hidden layers (231, 232, . . . , and 23$n$ shown in FIG. 2) and an output layer 240. Parameters included in the plurality of hidden layers may be obtained through pre-training based on related training data of a specific task type. For example, the task type may include image recognition, image classification, super-resolution image reconstruction, and the like.

At the neural network layer 230, the plurality of hidden layers is followed by the output layer 240, namely, a last layer of the entire CNN 200. The output layer 240 has a loss function similar to a categorical cross entropy, and the loss function is further configured to calculate a prediction error. Once forward propagation (for example, propagation in a direction from 210 to 240 in FIG. 2) of the entire CNN 200 is completed, back propagation (for example, propagation in a direction from 240 to 210 in FIG. 2) is started to update a weight value and a deviation of each layer mentioned above, to reduce a loss of the CNN 200 and an error between a result output by the CNN 200 by using the output layer and an ideal result.

It should be noted that the CNN 200 shown in FIG. 2 is merely used as an example of a CNN. During specific application, the CNN may alternatively exist in a form of another network model.

It should be understood that the CNN 200 shown in FIG. 2 may be used to perform the object detection method in embodiments of this disclosure. As shown in FIG. 2, a detection result of an image may be obtained after a to-be-processed image is processed by the input layer 210, the convolutional layer/pooling layer 220, and the neural network layer 230.

Figure 3:
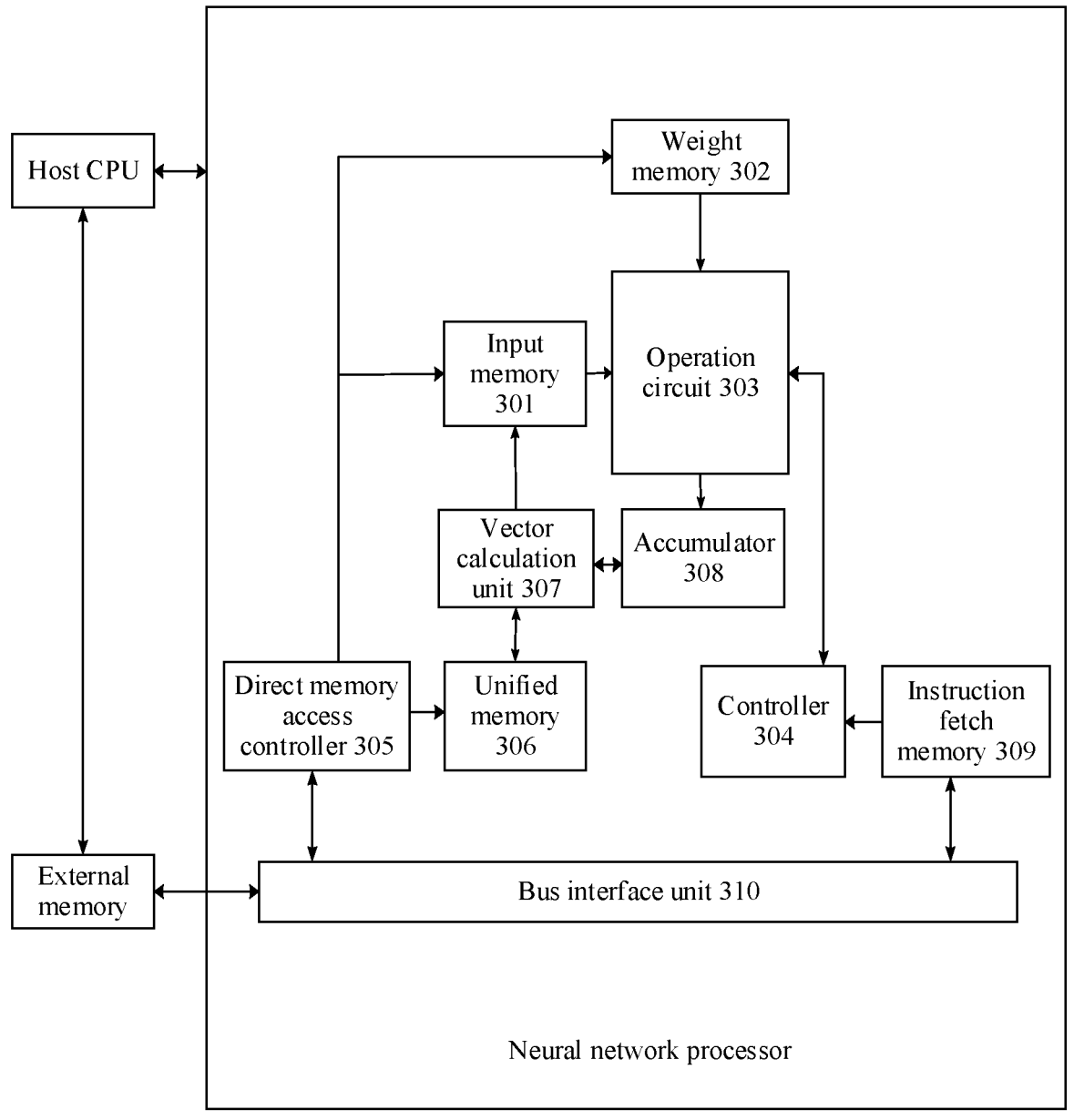
FIG. 3 is a schematic diagram of a hardware structure of a chip according to an embodiment of this disclosure.

FIG. 3 is a schematic diagram of a hardware architecture of a chip according to an embodiment of this disclosure. The chip includes a neural network processing unit. The chip may be disposed in the execution device 110 shown in FIG. 1, to complete calculation work of the computing module 111. The chip may alternatively be disposed in the training device 120 shown in FIG. 1, to complete training work of the training device 120 and output the target model/rule 101. All algorithms of the layers in the CNN shown in FIG. 2 may be implemented in the chip shown in FIG. 3.

The neural network processing unit (NPU) serves as a coprocessor, and may be disposed on a host central processing unit (CPU) (host CPU). The host CPU assigns a task. A core part of the NPU is an operation circuit 303, and a controller 304 controls the operation circuit 303 to extract data in a memory (a weight memory or an input memory) and perform an operation.

In some implementations, the operation circuit 303 includes a plurality of processing engines (PEs) inside. In some implementations, the operation circuit 303 is a two-dimensional systolic array. The operation circuit 303 may alternatively be a one-dimensional systolic array or another electronic circuit that can perform mathematical operations such as multiplication and addition. In some implementations, the operation circuit 303 is a general-purpose matrix processor.

For example, it is assumed that there are an input matrix A, a weight matrix B, and an output matrix C. The operation circuit 303 fetches, from a weight memory 302, data corresponding to the matrix B, and buffers the data in each PE of the operation circuit 303. The operation circuit 303 fetches data of the matrix A from an input memory 301, to perform a matrix operation on the matrix B, and stores an obtained partial result or an obtained final result of the matrix in an accumulator 308.

A vector calculation unit 307 may perform further processing such as vector multiplication, vector addition, an exponent operation, a logarithmic operation, or value comparison on output of the operation circuit 303. For example, the vector calculation unit 307 may be configured to perform network calculation, such as pooling, batch normalization, or local response normalization at a non-convolutional/non-fully connected (FC) layer in a neural network.

In some implementations, the vector calculation unit 307 can store a processed output vector in a unified cache 306. For example, the vector calculation unit 307 may apply a non-linear function to the output of the operation circuit 303. For example, the non-linear function is applied to a vector of an accumulated value to generate an activation value. In some implementations, the vector calculation unit 307 generates a normalized value, a combined value, or both. In some implementations, the processed output vector can be used as an activation input of the operation circuit 303, for example, can be used at a subsequent layer of the neural network.

The unified memory 306 is configured to store input data and output data.

For weight data, a direct memory access controller (DMAC) 305 directly transfers input data in an external memory to the input memory 301 and/or the unified memory 306, stores weight data in the external memory in the weight memory 302, and stores data in the unified memory 306 in the external memory.

A bus interface unit (BIU) 310 is configured to implement interaction between the host CPU, the DMAC, and an instruction fetch buffer 309 by using a bus.

The instruction fetch buffer 309 connected to the controller 304 is configured to store instructions used by the controller 304.

The controller 304 is configured to invoke the instructions cached in the instruction fetch buffer 309, to implement a working process of controlling an operation accelerator.

Usually, the unified memory 306, the input memory 301, the weight memory 302, and the instruction fetch buffer 309 each are an on-chip memory. The external memory is a memory outside the NPU. The external memory may be a double data rate (DDR) synchronous dynamic random-access memory (RAM) (SDRAM), a high bandwidth memory (HBM), or another readable and writable memory.

The data collection device 160 and the training device 120 in FIG. 1 may be respectively considered as a collection module and a training module provided in embodiments of this disclosure. The data collection device 160 and the training device 120 can perform corresponding steps of the processing method in embodiments of this disclosure. The CNN model shown in FIG. 2 and the chip shown in FIG. 3 may also be configured to perform the steps of the processing method in embodiments of this disclosure. The execution device 110 in FIG. 1 can perform the steps of the object detection method in the embodiments of this disclosure. The CNN model shown in FIG. 2 and the chip shown in FIG. 3 may also be configured to perform the steps of the object detection method in the embodiments of this disclosure. The following describes in detail the processing apparatus and method, and the object detection apparatus and method provided in embodiments of this disclosure with reference to the accompanying drawings.

Figure 4:
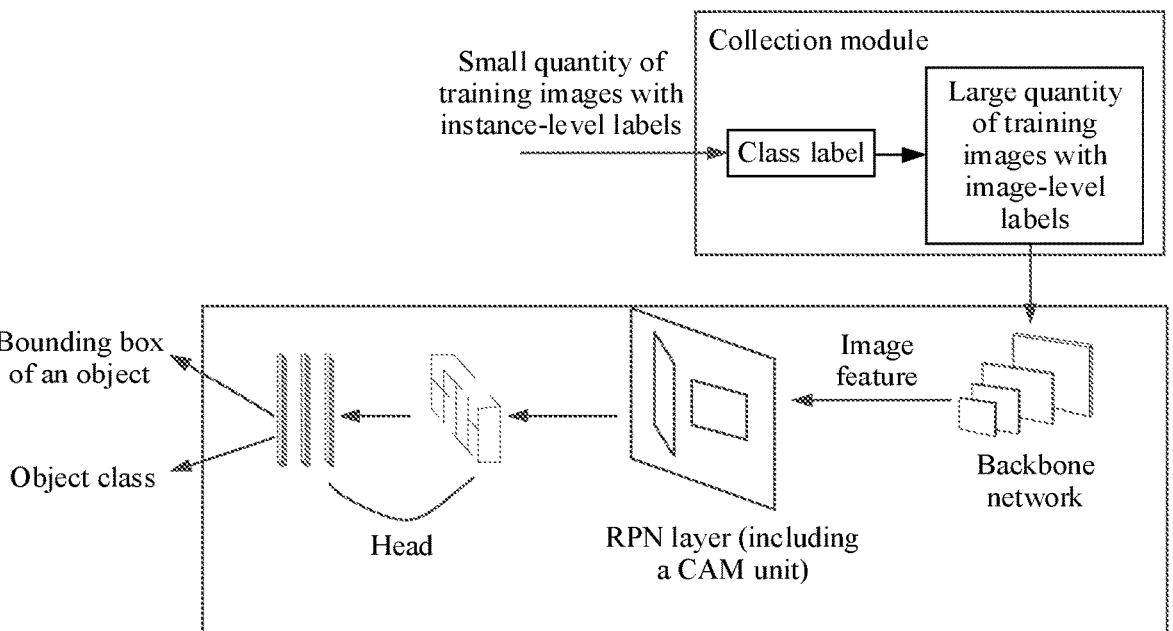
FIG. 4 is a schematic diagram of a structure of a system architecture according to an embodiment of this disclosure.

The following describes in detail a system architecture provided in an embodiment of this disclosure with reference to FIG. 4.

FIG. 4 is a schematic diagram of a structure of a processing system according to an embodiment of this disclosure. As shown in FIG. 4, the processing system includes a collection module and a training module. The training module includes a backbone network and an RPN layer, the backbone network is connected to the RPN layer, and the RPN layer includes a CAM unit. The processing system may be deployed on a processing apparatus. The processing apparatus may be a device with a strong computing capability, for example, a cloud server, a computer device, a server device, or a computing device.

The collection module is configured to obtain an image, where the image includes an image with an instance-level label and an image with an image-level label.

When the solution provided in this disclosure is applied to a scenario of an object detection model training solution on a cloud computing platform, the image with an instance-level label (the image with an instance-level label is sometimes referred to as data with an instance-level label or data with an instance-level label in this disclosure) may be training data uploaded by a user. The user uploads the training data to the cloud computing platform by using a front-end system. Further, a collection module in the cloud computing platform receives the training data uploaded by the user.

In comparison with the conventional technology in which a user needs to upload a large quantity of images with instance-level labels as training data, in the solution provided in this disclosure, the user is allowed to upload a small quantity of images with instance-level labels as training data. For example, in the conventional technology, to achieve expected effect, 1000 pieces of data with instance-level labels need to be used as training data to obtain a target model with the expected effect. According to the solution provided in this embodiment of this disclosure, a user may need to upload only 500 pieces of data with instance-level labels as training data, to obtain a target model with expected effect. For details, refer to further analysis and descriptions with reference to specific experimental data in the following.

There may be a plurality of storage formats and label generation manners of the data with an instance-level label. For example, the data with an instance-level label may be stored in different image formats (for example, Portable Network Graphics (PNG) and Joint Photographic Experts Group (JPEG)), or may be stored in a general storage format (for example, npy, TFRecord, or mat). An instance-level annotation manner may use bounding box coordinates and a label, or may use a semantic image segmentation manner. The user may directly use a pre-stored instance-level label, or may directly annotate an uploaded image by using an annotation tool provided by the front-end system in the conventional technology. The front-end system is mainly used to upload training data, and download and use a trained model. For an image with a simple background, a bounding box of an object may be automatically extracted by using foreground detection technology, and the user manually selects a class label.

Both the image with an instance-level label and the image with an image-level label include a class label (or a label). The class label is used to label a class of an image, and one image may include a plurality of labels. For example, based on a class of an object included in an image, a class label of the image may include one or more of the following class labels: a man, a woman, a bicycle, a handbag, and the like. In a specific implementation of this disclosure, the collection module may obtain the image with an image-level label based on a class label of the image with an instance-level label. For example, the image with an image-level label is obtained based on the class label in an existing image classification dataset, or the class label may be used as a keyword to search a network for an image as the image with an image-level label. It should be noted that, in addition to obtaining the image with an image-level label by using the class label of the image with an instance-level label mentioned in this implementation, in another specific implementation, the user may upload the image with an image-level label, that is, both the image with an instance-level label and the image with an image-level label are the training data uploaded by the user by using the front-end system.

The backbone network is used to output a feature map of the image based on the image obtained by the collection module.

The backbone network may perform convolution processing, regularization processing, or the like on the image obtained by the collection module, and output feature maps, corresponding to the image, with different resolutions, that is, output feature maps, corresponding to the image, with different sizes. In other words, the backbone network extracts a basic feature, and provides a corresponding feature for another subsequent processing process.

The RPN layer is used to determine a proposal region of the image based on the feature map.

The feature map may be input into a conventional object detector (for example, Faster-RCNN) for processing, to obtain an initial proposal region. Further, a convolutional feature of the entire image is obtained. The image may be divided into different blocks based on a specific size requirement, then a feature corresponding to an image in each block is scored, and a block with a high score is selected as an initial proposal region.

The RPN layer is further used to determine, by using the CAM unit, a CAM (the CAM is sometimes referred to as a CAM heat map in this disclosure, and when a difference between the CAM and the CAM heat map is not emphasized, they are the same) corresponding to the proposal region, and determine, based on the CAM heat map, a probability that the proposal region belongs to a foreground.

The CAM is a visualization tool for detecting prominence of a network result. The feature map of the proposal region may be converted into the CAM by using the CAM unit, and a probability that the proposal region belongs to each class is determined by using an average heat map intensity of the proposal region. The CAM is used to display a part of the input image that is used to determine a final class of the image. For example, if the input image is a cat, which information (for example, a proposal region of the image includes a head, claws, a body, and the like of the cat) of the image is used in the model to classify the image as a cat? The heat map herein is used to mark a useful region in the proposal region. To distinguish function weights of different regions, different colors are used in the image.

The CAM unit may be used to determine a probability that a proposal region belongs to each class, and recognize a region of the image that is most related to a class. For example, a plurality of heat maps may be determined for each class. A larger average heat map intensity corresponding to the class indicates a larger probability that a proposal region in which the heat map is located belongs to a class.

It is assumed that the feature map of the proposal region is f, and the CAM unit generates a corresponding CAM heat map A ($\#Class \times h \times w$) for the input feature map f of the proposal region, where h and w are respectively a length and a width of the feature map of the proposal region, and #Class indicates a quantity of classes. There is a plurality of heat maps A herein. The following uses one of the heat maps as an example for description. A larger intensity of the heat map A indicates a larger probability that the proposal region corresponding to A belongs to a class of a to-be-recognized object.

A response intensity (or an average CAM intensity or a CAM response intensity, and when a difference between the response intensity, the average CAM intensity, and the CAM response intensity is not emphasized in this disclosure, they are the same) may be a probability that a proposal region belongs to a class, further, a probability, that a proposal region belongs to a class, that is determined by the CAM unit based on an average heat map intensity of a CAM. For example, classes include a handbag and a backpack, an average heat map intensity of the handbag in the proposal region is 90, and an average heat map intensity of the backpack in the proposal region is 10. In this case, it may be considered that the response intensity of the proposal region belonging to the handbag is 90, and the response intensity of the proposal region belonging to the backpack is 10. A probability that the proposal region is the handbag is greater than a probability that the proposal region is the backpack, and it may be considered that the proposal region is more likely to be a handbag.

In a specific implementation, the RPN layer is further configured to determine a confidence of the proposal region. The confidence may be a probability that the proposal region belongs to a class. The confidence may indicate a degree that the proposal region belongs to a class. A larger confidence indicates a larger probability that the proposal region belongs to a class. For example, classes may include male and female. A probability that the proposal region belongs to a female class is 90%, and a probability that the proposal region belongs to a male class is 10%. Therefore, the confidence of the proposal region belonging to the female class is 90, and the confidence of the proposal region belonging to the male class is 10. In other words, a person in the proposal region is more likely to be female. In a specific implementation, a probability that the proposal region is used as the foreground may be determined, based on a weighted sum of the confidence and the response intensity. For example, the class may include a cat and a dog. A confidence of a first proposal region belonging to the cat is 90. A response intensity of the first proposal region belonging to the cat is 80. A confidence of the first proposal region belonging to the dog is 10. A response intensity of the first proposal region belonging to the dog is 30. A confidence of a second proposal region belonging to the cat is 10. A response intensity of the second proposal region belonging to the cat is 20. A confidence of the second proposal region belonging to the dog is 90. A response intensity of the second proposal region belonging to the dog is 70. It may be considered that a weighted sum of the confidence and the response intensity of the first proposal region belonging to the cat is greater than a weighted sum of the confidence and the response intensity of the second proposal region belonging to the cat, and a weighted sum of the confidence and the response intensity of the second proposal region belonging to the dog is greater than a weighted sum of the confidence and the response intensity of the second proposal region belonging to the dog. It may be considered that the first proposal region is more likely to be a cat, and the second proposal region is more likely to be a dog. If the weighted sums of the two proposal regions reach a specific value, it may be considered that probabilities that the two proposal regions are used as the foreground are both very large.

In this disclosure, the CAM unit is added to the RPN layer. The CAM heat map of the proposal region may be determined by using the CAM unit, and the probability that the proposal region belongs to the foreground is determined based on the CAM heat map. According to the solution provided in this disclosure, a high-performance model can be trained by using only a small amount of training data with instance-level labels without using a large quantity of images with instance-level labels as training data.

In a specific implementation, the training module may further include N heads, where N is a positive integer, and the head is connected to the RPN layer. The RPN layer may input, to the N heads, a feature of the proposal region with a large probability belonging to the foreground, for example, input the feature to a first-level head. The first-level head outputs an object detection result of a to-be-detected object based on the feature of the proposal region, and the detection result includes a class of the to-be-detected object and a bounding box of the object. In a specific implementation, when N is a positive integer greater than 1, the N heads may be connected in series. Heads at all levels have a same structure, and an internal process is the same as that of the first-level head. Output data of a previous head is used as input data of a next head, and a last head outputs a class and a bounding box of an object. A plurality of heads connected in series can further improve accuracy of object detection or object recognition.

In a process of training the neural network, a set of initial model parameters may be set for the neural network, and then the model parameters of the neural network are gradually adjusted based on a difference between an object detection result of a to-be-detected object in a training image and an object detection annotation result of the to-be-detected object in the training image, until the difference between the object detection result of the to-be-detected object in the training image and the object detection annotation result of the to-be-detected object in the training image falls within a specific preset range. Alternatively, when a quantity of times of training reaches a preset quantity of times, a model parameter of the neural network in this case is determined as a final parameter of the neural network. In this way, training of the neural network is completed. In this process, a loss function needs to be used. In comparison with the conventional technology, a CAM loss and an MID loss are introduced in the solution provided in this disclosure. The following describes the processing method provided in this disclosure.

Figure 5:
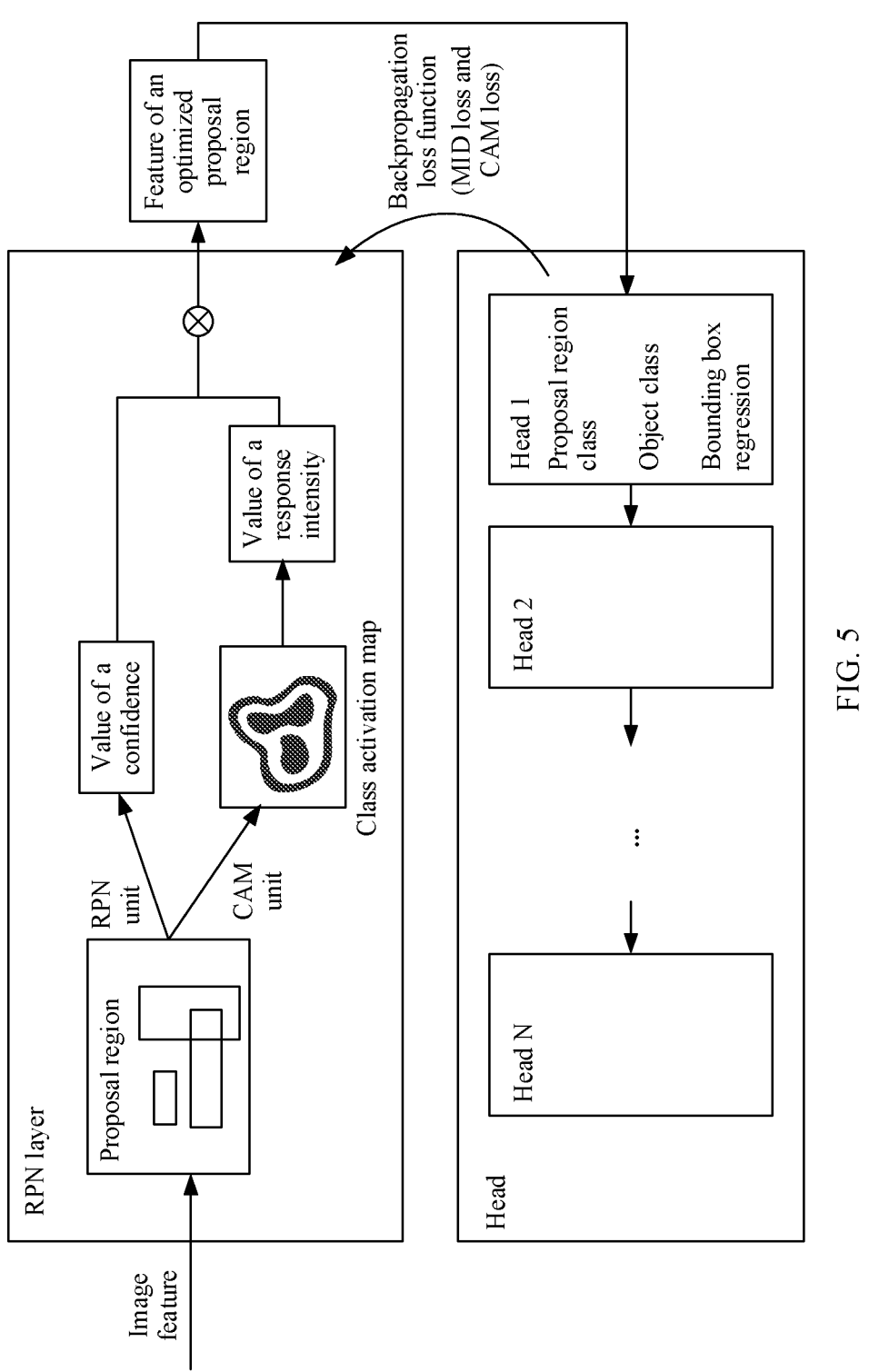
FIG. 5 is a schematic diagram of a structure of a training module according to an embodiment of this disclosure.

1. Training Phase:

FIG. 5 is a schematic diagram of a training module according to this disclosure. As shown in FIG. 5, the training module includes a backbone network, an RPN layer, and a head. The backbone network is connected to the RPN layer, and the RPN layer includes a CAM unit.

The backbone network is used to output a feature map of an image. In this disclosure, an image used for training data includes an image with an instance-level label and an image with an image-level label. For how to obtain the image with an instance-level label and the image with an image-level label, refer to the manner in the embodiment corresponding to FIG. 4. Details are not described herein again.

The RPN layer includes two modules: a conventional RPN unit, and the CAM unit newly added in this disclosure. In the conventional technology, the RPN unit can receive and process only a feature map of the image with an instance-level label. However, the CAM unit newly added in this disclosure can receive and process both the feature map of the image with an instance-level label and a feature map of the image with an image-level label.

The feature map output by the backbone network is separately input to the RPN unit and the CAM unit at the RPN layer, and the RPN unit is configured to calculate an RPN loss of the image with an instance-level label. The RPN loss is a calculated information entropy loss between a probability (or a proposal probability) that all proposal regions include a class of object and a real probability (if N regions include a same class of object, a real probability of each region is 1/N), where a normalized exponential function between proposal regions is calculated, and the proposal probability is generated for each class. A background is used as an independent class. Therefore, the proposal probability is a $(P \times (C+1))$-dimensional matrix, where P is a quantity of proposal regions and C is a quantity of classes.

The CAM unit determines, based on the feature map, a CAM heat map corresponding to the proposal region. The CAM unit may further be configured to calculate CAM losses of the image with an instance-level label and the image with an image-level label. The CAM loss is a loss function for calculating an average difference between a CAM heat map and a detection label, and is used for model training of the CAM unit. Further, the CAM loss includes a class loss loss (CAM-cls) for the image-level label and a segmentation loss loss (CAM-seg) for the instance-level label. The class loss loss (CAM-cls) indicates a difference between a response intensity of a class of an object in the proposal region of the image with an image-level label and an actual class of the object in the image. For example, a class label of the image with an image-level label is a cat, a larger CAM response intensity of a class of cat in the proposal region indicates a smaller class loss loss (CAM-cls), and a smaller CAM response intensity of the class of cat in the proposal region indicates a larger class loss loss (CAM-cls). The segmentation loss loss (CAM-seg) of instance-level annotation indicates a difference between a location that is of a target object in the image and that is determined based on the CAM response intensity of the proposal region of the image with an instance-level label and an actual location, in the image, of the target object annotated by a bounding box of the object included in the image with an instance-level label. For example, in the image with an instance-level label, a location with a larger CAM response intensity that is closer to the location corresponding to the bounding box of the object indicates a smaller segmentation loss loss (CAM-seg). A location with a larger CAM response intensity that is not closer to the location corresponding to the bounding box of the object indicates a larger segmentation loss loss (CAM-seg).

Further, for the image with an instance-level label, the CAM response intensity in the annotated bounding box of the object may be calculated, to evaluate whether the CAM can capture the target object (the target object is determined as a prominent object of a corresponding class). Therefore, this disclosure proposes the loss function loss (CAM-seg), to maximize the CAM response intensity in the bounding box of the object in the training image with an instance-level label. In addition, information about the CAM in different dimensions can be obtained by using a pooling layer. An average response intensity corresponding to each class in the CAM heat map may be obtained through space average pooling. An objective of this disclosure is that the response intensity sequence is consistent with an image-level annotated one-hot vector of the response intensity sequence. In other words, when an object of a corresponding class exists in the image, a response intensity of the class may be large. Therefore, this disclosure proposes the loss function loss (CAM-cls), to minimize an information entropy between the one-hot vector and the response intensity. The one-hot vector may be understood as that an N-bit status register is used to encode N statuses. Each status has an independent register bit, and only one bit in register bits is valid. In other words, there is only one status. For example, it is assumed that there are n words in a word library, and a 1×n high-dimensional vector is opened. Each word is 1 in an index, and values at other locations are 0.

A feature of an optimized proposal region is obtained based on the proposal region obtained by the RPN unit and the heat map obtained by the CAM unit. Further, a probability that the proposal region is used as a foreground is determined based on a weighted sum of a confidence and the response intensity. For how to understand the confidence and the response intensity, refer to the embodiment corresponding to FIG. 4. Details are not described herein again. A feature included in a proposal region with a high probability that the proposal region is used as the foreground is determined as the feature of the optimized proposal region, and the feature of the optimized proposal region is input into the head.

The head calculates an MID loss of the feature map of the image with an image-level label, and calculates an MID loss and a classification loss of the feature map of the image with an instance-level label. The MID loss is a loss function derived from multiple instance learning for an image with an image-level label. Further, a probability that a series of proposal regions of an image belong to a class is converted, through edge distribution, into a probability that the image includes a label of the class, and a difference between the probability and an actual probability (the probability that the image includes an object of the class is 1, or the probability that the image includes an object of the class is 0) is calculated. The classification loss is a loss function for calculating a difference between a proposal region and an instance-level label. Further, a normalized exponential function between classes is calculated, a probability that each proposal region belongs to each class is calculated, and then an information entropy between the classification probability and the instance-level label is calculated. A probability that each image includes a class of object may be calculated by using a classification probability and a proposal probability. The classification probability is a probability that the proposal region is closest to a class of object in all proposal regions, and the proposal probability is a probability that the proposal region includes a class of object in all classes. The probability that each image includes a class of object, namely, $g_c = \Sigma_{i \leq p} p_{ic} s_{ic}$, is equivalent to a marginal distribution of a joint distribution including the classification probability and the proposal probability, where $p_{ic}$ is a proposal probability of a class c corresponding to an $i^{th}$ proposal region, and $s_{ic}$ is a classification probability of the class c corresponding to the $i^{th}$ proposal region. In a specific implementation, the head further includes a bounding box regression module configured to optimize the bounding box of the object by using a regression algorithm, and calculate a regression loss of the image with an instance-level label. The regression loss is a multi-variable correlation metric value based on regression analysis. Common regression losses include linear regression, log-linear regression, autoregression, and the like.

During training, heads at each layer have a same structure, and a final loss is a weighted sum of losses of heads at a plurality of layers. A difference between an object detection result of a to-be-detected object and an object detection annotation result of the to-be-detected object in a training image is determined based on the foregoing loss functions, for example, the MID loss and the CAM loss, and model parameters of a neural network are gradually adjusted, until the difference between the object detection result of the to-be-detected object in the training image and the object detection annotation result of the to-be-detected object in the training image falls within a specific preset range. Alternatively, when a quantity of times of training reaches a preset quantity of times, a model parameter of the neural network in this case is determined as a final parameter of the neural network. In this way, training of the neural network is completed.

Figure 6:
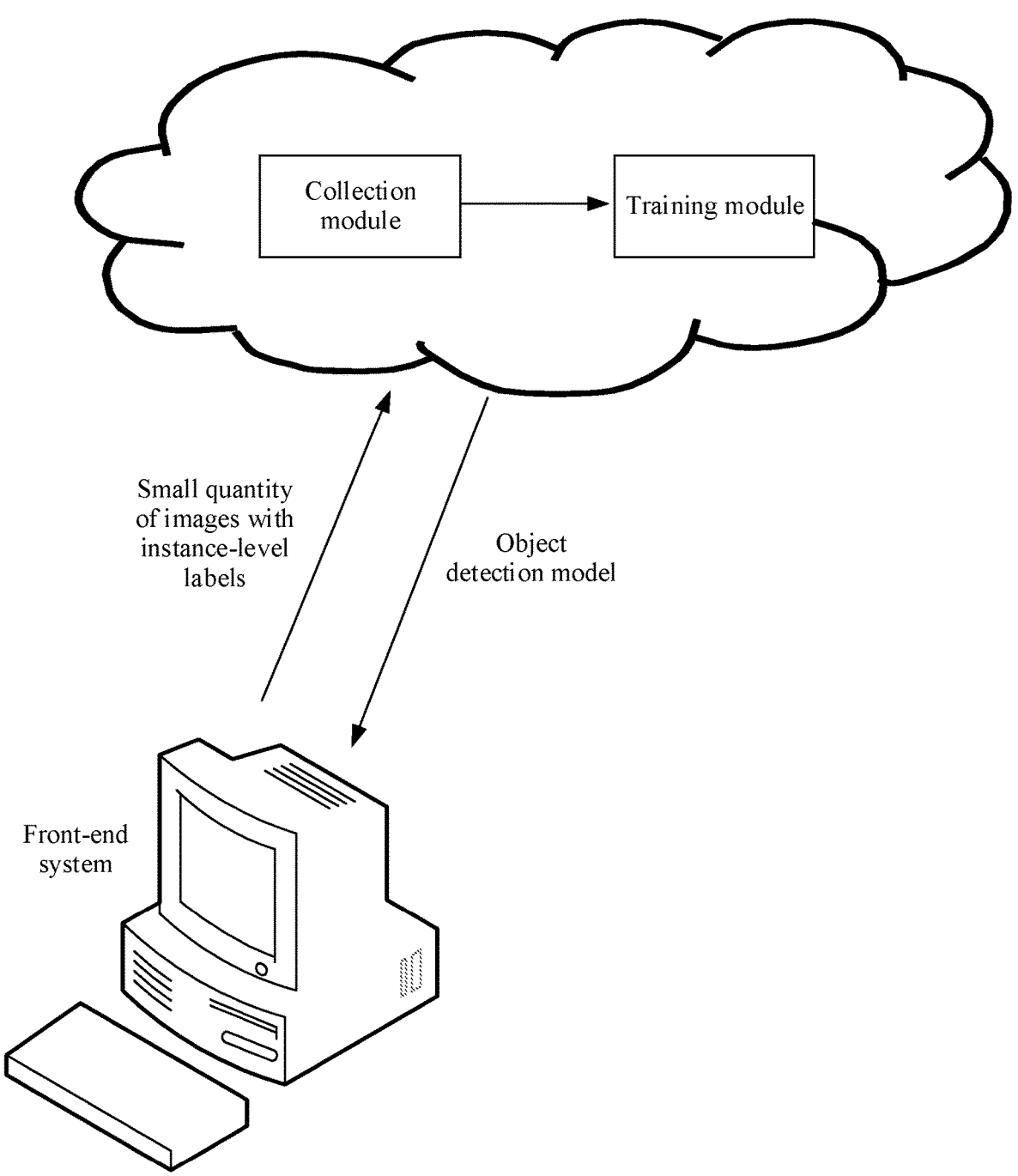
FIG. 6 is a schematic diagram of a structure of an object detection service apparatus based on a cloud computing platform according to an embodiment of this disclosure.

FIG. 6 is a schematic diagram of a structure of an object detection service apparatus based on a cloud computing platform according to an embodiment of this disclosure.

Refer to FIG. 6. This embodiment provides an object detection service apparatus based on a cloud computing platform, including a front-end system and a cloud server. The cloud server includes a collection module and a training module. The front-end system mainly uploads user data (including an image and a label) and downloads or uses a trained model. The data collection module automatically collects data with an image-level label by using a class label and/or other auxiliary information uploaded by a user. An end-to-end hybrid supervised training module implements a function of jointly training a detection model based on the data uploaded by the user and the automatically collected data.

The front-end system and a back-end system have different core algorithms, and can be implemented in a plurality of manners. Functions such as storing and transmitting data, downloading a model and invoking an application programming interface (API), and a user interface are usually implemented by directly invoking a corresponding service of the cloud computing platform, including but not limited to a cloud disk, a virtual machine, an API management system, a network application program, and the like.

There may be a plurality of data storage formats and label generation manners of data with an instance-level label used in this disclosure. Image data may be stored in different image formats (for example, PNG and JPEG), or may be stored in a general storage format (for example, npy, TFRecord, or mat). Instance-level annotation may use bounding box coordinates and a label, or may use semantic image segmentation. The user may directly use a pre-stored instance-level label, or may directly annotate an uploaded image by using an annotation tool provided by the front-end system, and the annotation tool/method includes but is not limited to labelling, one-click annotation, and the like. For an image with a simple background, a bounding box of an object may be automatically extracted by using foreground detection, and the user manually selects a class label.

The collection module collects data with an image-level label by collecting an existing (image classification) dataset and searching a network for an image based on an object label. In labels of the existing dataset, a part that is the same as a label of a task object is found, and the task object label is assigned to a corresponding image as an image-level label of the task object. However, during network image searching, the label of the task object is used as a keyword for image searching.

To improve reliability of the collected data, the image uploaded by the user may be used for comparison, to eliminate impact of different objects with a same name, and supplement domain information other than the label.

The training module uses data with an instance-level label uploaded by the user and data with an image-level label collected by the data collection module, to train the detection model in a hybrid supervised manner. For training the model, refer to the embodiments corresponding to FIG. 4 and FIG. 5. Details are not described herein again.

Figure 7:
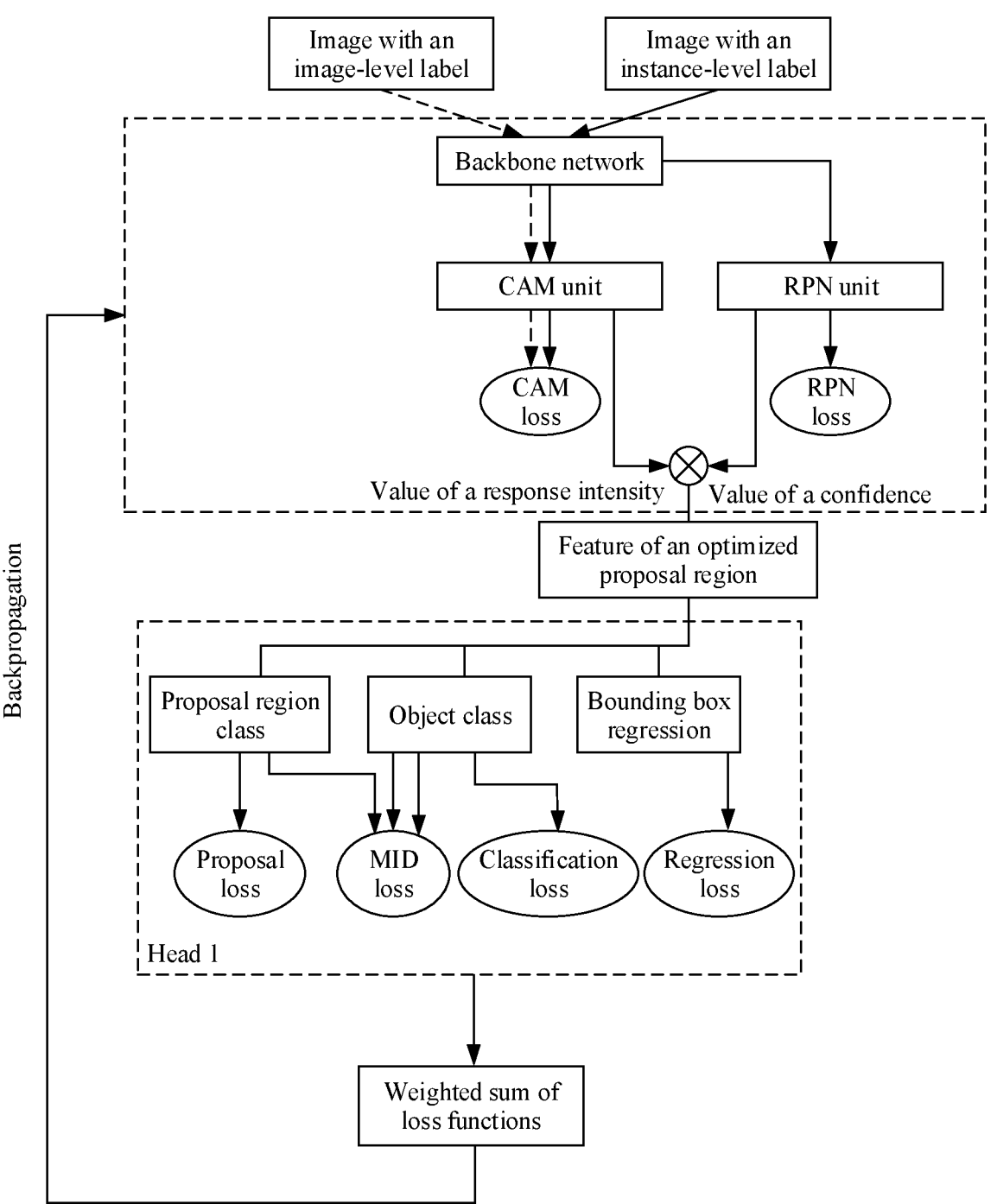
FIG. 7 is a schematic flowchart of a processing method according to an embodiment of this disclosure.

FIG. 7 is a schematic flowchart of a training method according to an embodiment of this disclosure.

Step 1: Input an image, where data with an instance-level label and data with an image-level label are included in a training phase.

Step 2: Extract a feature map by using an existing backbone network.

Step 3: Calculate an RPN loss of the data with an instance-level label by using an RPN unit at an RPN layer.

Step 4: Calculate a CAM heat map and CAM losses of the data with an instance-level label and the data with an image-level label by using a CAM unit at the RPN layer.

Step 5: Determine a response intensity and a confidence based on a proposal region and the heat map that are obtained in Step 3 and Step 4, and obtain a feature of an optimized proposal region based on a weighted sum of the response intensity and the confidence.

Step 6: Calculate a proposal region class by using a proposal region classification unit in a head 1, calculate an MID loss of the data with an image-level label, and calculate an MID loss and a proposal loss of the data with an instance-level label.

Step 7: Calculate an object class by using an object classification unit in the head 1, calculate the MID loss of the data with an image-level label, and calculate the MID loss and a classification loss of the data with an instance-level label.

Step 8: A bounding box regression unit in the head 1 performs calculation by using a regression algorithm, to optimize a bounding box of an object, and calculates a regression loss of the data with an instance-level label.

Step 9: Obtain a feature of an optimized proposal region based on the proposal region, the object class, and the bounding box of the object that are obtained in Step 6, Step 7, and Step 8.

In a specific implementation, the head module and subsequent heads (for example, a head 2) may be sequentially entered, and an internal procedure of the head 2 is the same as that of the head 1.

For training data, weighted summing is performed on the losses obtained in Step 3 to Step 9, to obtain a total loss, and the entire network model is updated through backpropagation.

Figure 8:
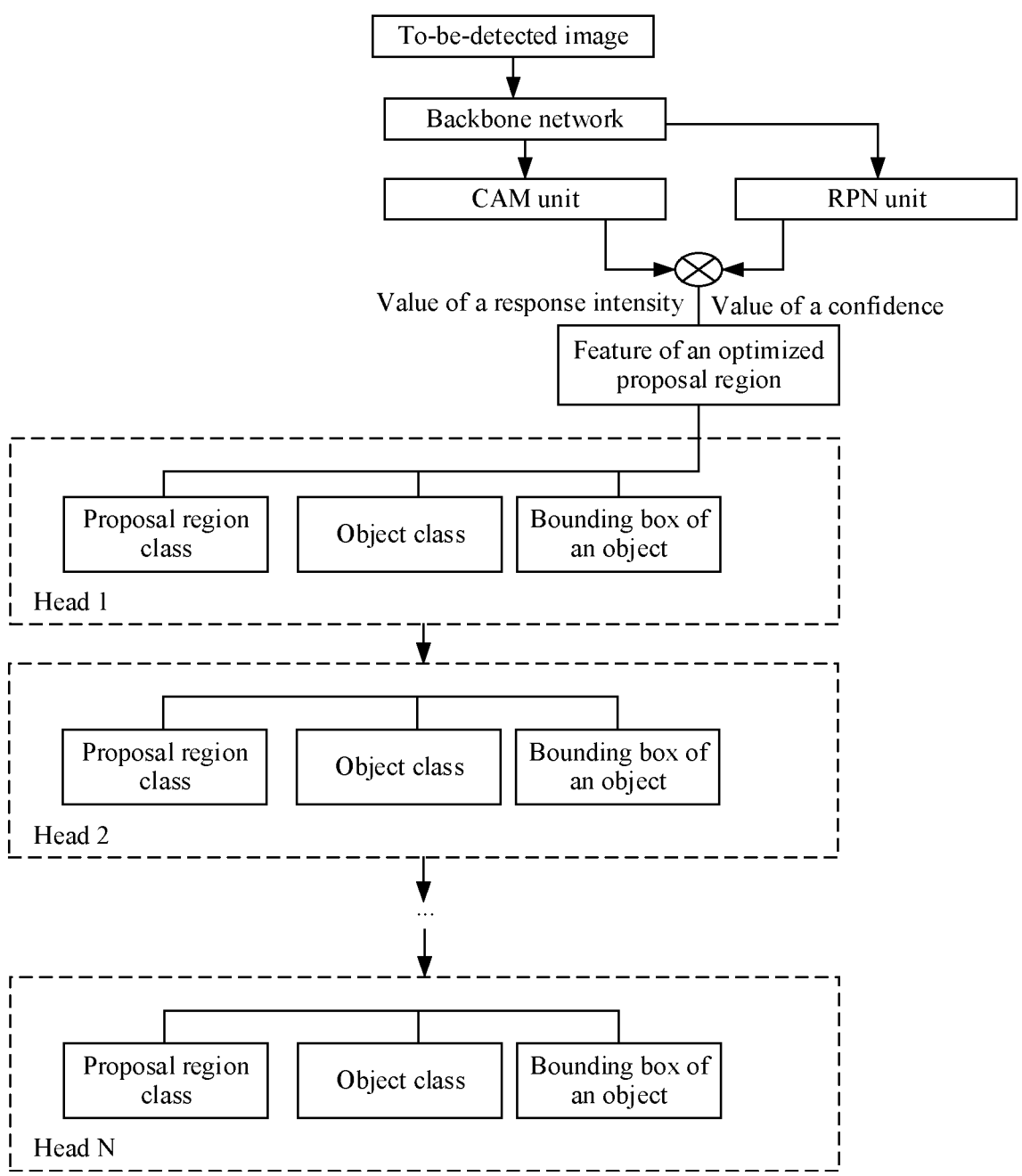
FIG. 8 is a schematic flowchart of an object detection method according to an embodiment of this disclosure.

2. Application Phase:

In this embodiment of this disclosure, the application phase describes a process in which the execution device 110 detects and recognizes an object by using the obtained training model. Further, FIG. 8 is a schematic flowchart of an object detection method according to an embodiment of this disclosure. The object detection method provided in this embodiment of this disclosure may include the following steps.

Step 1: Receive a to-be-detected image.

Step 2: Extract and output a feature map of the to-be-detected image by using an existing backbone network.

Step 3: Determine a confidence of a proposal region by using an RPN unit at an RPN layer.

Step 4: Calculate a CAM heat map and determine a response intensity of the proposal region by using a CAM unit at the RPN layer.

Step 5: Obtain a feature of an optimized proposal region based on the response intensity and the confidence that are obtained in Step 3 and Step 4 and based on a weighted sum of the response intensity and the confidence.

Step 6: Calculate a proposal region class by using a proposal region classification unit in a head 1.

Step 7: Calculate an object class by using an object classification unit in the head 1.

Step 8: A bounding box regression unit in the head 1 performs calculation by using a regression algorithm, to optimize a bounding box of an object.

Step 9: Obtain a feature of an optimized proposal region based on the proposal region, the object class, and the bounding box of the object that are obtained in Step 6, Step 7, and Step 8.

In a specific implementation, the head module and subsequent heads (for example, a head 2) may be sequentially entered, and an internal procedure of the head 2 is the same as that of the head 1.

The proposal region, the object class, and the bounding box of the object obtained by a last head are output.

With reference to specific experimental data, the following uses Table 1 as an example to compare effect of the existing solution and effect of the solution provided in this disclosure. A first solution shown in Table 1 is BAOD. BAOD is also a solution in which both data with an instance-level label and data with an image-level label can be used to train an object detection model. A PASCAL VOC 2007 dataset is used. The PASCAL VOC 2007 dataset includes 5011 training images and 4952 test images. An average precision (AP) and a mean average precision (mAP) are mainly used to evaluate object detection effect.

As shown in Table 1, when model training and testing are performed on the PASCAL VOC 2007 dataset, and percentages of images with instance-level labels in total training data are different, for example, 10%, 20%, 30%, 40%, 50%, 60%, 70%, 80% and 90% of the total training data, both an AP and an mAP in the solution provided in this disclosure are greater than an AP and an mAP in the first solution, and a larger AP and a larger mAP indicate better object detection effect. It can be learned from Table 1 that, in the solution provided in this disclosure, accuracy of object detection can be significantly improved by using different proportions of training data with instance-level labels. Compared with the existing solution in which a model can be jointly trained by using an image with an instance-level label and an image with an image-level label, this solution can achieve better detection effect.

TABLE 1

| Proportion | Method | AP | AP | AP | AP | AP | AP | AP | AP | AP | AP | AP | AP | AP | mAP |
|---|---|---|---|---|---|---|---|---|---|---|---|---|---|---|---|---|
| 10% | First solution | 51.6 | 50.7 | 52.6 | 41.7 | 36 | 52.9 | 63.7 | 69.7 | 34.4 | 65.4 | 22.1 | 66.1 | 43.3 | 50.9 |
| | Present solution | 60.6 | 65.2 | 55 | 35.4 | 32.8 | 66.1 | 71.3 | 75.3 | 38.3 | 54.1 | 26.5 | 71.7 | 48.6 | 55.3 |
| 20% | First solution | 57 | 62.2 | 60 | 46.6 | 46.7 | 60.0 | 70.8 | 74.4 | 40.5 | 71.9 | 30.2 | 72.7 | 48.4 | 58.6 |
| | Present solution | 65.5 | 72.3 | 66.7 | 45.6 | 50.8 | 72.2 | 77.8 | 82.2 | 44.3 | 73.1 | 44.8 | 79.3 | 62.1 | 64.9 |

TABLE 1-continued

| Proportion | Method | AP | AP | AP | AP | AP | AP | AP | AP | AP | AP | AP | AP | AP | mAP |
|---|---|---|---|---|---|---|---|---|---|---|---|---|---|---|---|
| 30% | First solution | 66.4 | 70.0 | 65.8 | 46.8 | 52.0 | 71.2 | 76.3 | 77.8 | 43.7 | 73.4 | 40.6 | 73.3 | 52.9 | 63.3 |
| | Present solution | 73.8 | 76.1 | 70.6 | 51.1 | 52.4 | 75.1 | 79.9 | 83.4 | 46.9 | 77.0 | 55.5 | 81.8 | 66.8 | 68.6 |
| 40% | First solution | 68.6 | 71.3 | 66.6 | 52.5 | 53.1 | 69.6 | 77.7 | 77.2 | 45.7 | 72.7 | 54.0 | 74.4 | 56.8 | 65.5 |
| | Present solution | 75.8 | 78.4 | 72.9 | 56.7 | 55.2 | 76.1 | 81.3 | 83.9 | 51.2 | 76.2 | 60.0 | 83.3 | 64.4 | 70.4 |
| 50% | First solution | 70.1 | 73.1 | 70.4 | 52.0 | 57.0 | 73.1 | 79.4 | 77.1 | 47.4 | 77.5 | 54.0 | 76.6 | 61.3 | 67.5 |
| | Present solution | 73.4 | 77.8 | 72.9 | 57.5 | 57.2 | 79.5 | 81.6 | 83.5 | 53.7 | 79.0 | 60.4 | 83.5 | 67.3 | 71.5 |
| 60% | First solution | 73.5 | 75.3 | 72.4 | 52.5 | 53.3 | 76.5 | 81.1 | 81.0 | 51.0 | 76.7 | 57.9 | 76.8 | 63.0 | 69.2 |
| | Present solution | 74.4 | 81.3 | 72.7 | 58.1 | 58.9 | 82.3 | 83.9 | 82.9 | 54.2 | 77.6 | 63.5 | 82.6 | 71.8 | 72.7 |
| 70% | First solution | 77.7 | 76.6 | 73.4 | 55.2 | 57.0 | 78.4 | 81.2 | 83.7 | 53.1 | 77.9 | 65.5 | 82.6 | 66.4 | 71.6 |
| | Present solution | 76.9 | 81.7 | 77.9 | 61.5 | 59.8 | 82.7 | 83.9 | 84.1 | 55.5 | 79.5 | 64.6 | 84.9 | 68.9 | 74.1 |
| 80% | First solution | 76.7 | 76.4 | 74 | 56.8 | 62.0 | 81.4 | 82.1 | 84.8 | 57.3 | 78.2 | 61.2 | 81.9 | 67.6 | 72.3 |
| | Present solution | 83.1 | 82.9 | 77 | 60.6 | 63.4 | 81.5 | 85.2 | 86.1 | 56.2 | 80.5 | 65.9 | 84.2 | 71.7 | 74.8 |
| 90% | First solution | 80.9 | 81.6 | 78 | 60.4 | 63.5 | 79.5 | 84.4 | 85.1 | 57.2 | 79.2 | 62.9 | 84.3 | 68.9 | 74.3 |
| | Present solution | 82.8 | 82.6 | 76.2 | 59.9 | 63.7 | 79.4 | 84.8 | 85.4 | 57.2 | 78.5 | 65.0 | 85.0 | 71.5 | 74.9 |

The following uses Table 2 as an example to compare effect of the existing solution and effect of the solution provided in this disclosure. Table 2 shows several different solutions in the conventional technology. A second solution is SSD, a third solution is Retina Net, a fourth solution is Faster-R-CNN, a fifth solution is FPN, a sixth solution is FASF, and a seventh solution is AlignDet. The several solutions perform training based on classic deep learning models VGG16, ResNet-50, and ResNet-101. It should be noted that in the solution provided in this disclosure, it may be considered that a CAM unit is added to several classic deep learning models. For details, refer to FIG. 4 to FIG. 8. Details are not described herein again.

An MSCOCO dataset used for model training includes 80 class labels of common objects, about 11,000 training images, and 5,000 test images. An AP and a precision (AP50) when an IoU threshold is greater than 0.5 are mainly used to evaluate object detection effect.

As shown in Table 2, in this disclosure, only 30% of images with instance-level labels are used as training data, or 50% of images with instance-level labels are used as training data, so that effect of training models, including a strong supervised training model, in the several existing solutions can be achieved.

TABLE 2

| Method | Classic deep learning model | AP | AP50 |
|---|---|---|---|
| Second solution | VGG16 | 26.8 | 46.5 |
| Third solution | ResNet-50 | 35.6 | 54.7 |
| Fourth solution | ResNet-50 | 32.6 | 53.1 |
| Fifth solution | ResNet-50 | 35.9 | 56.9 |
| Sixth solution | ResNet-50 | 37.2 | 57.2 |
| Seventh solution | ResNet-50 | 37.9 | 57.7 |
| This solution (30%) | ResNet-50 | 35.3 | 54.2 |
| This solution (50%) | ResNet-50 | 37.8 | 56.5 |
| Second solution | ResNet-101 | 31.2 | 50.4 |

TABLE 2-continued

| Method | Classic deep learning model | AP | AP50 |
|---|---|---|---|
| Third solution | ResNet-101 | 37.7 | 57.2 |
| Fourth solution | ResNet-101 | 34.9 | 55.7 |
| Fifth solution | ResNet-101 | 37.2 | 59.1 |
| Sixth solution | ResNet-101 | 39.3 | 59.2 |
| Seventh solution | ResNet-101 | 39.8 | 60.0 |
| This solution (30%) | ResNet-101 | 37.5 | 56.8 |
| This solution (50%) | ResNet-101 | 40.0 | 59.4 |

The foregoing describes in detail the system architecture, the neural network training method (the processing method), and the object detection method in embodiments of this disclosure with reference to the accompanying drawings. The following describes in detail a related apparatus in embodiments of this disclosure with reference to FIG. 9 to FIG. 11. It should be understood that a processing apparatus shown in FIG. 9 can perform steps of the processing method in embodiments of this disclosure. An object detection apparatus shown in FIG. 10 and FIG. 11 can perform steps of the object detection method in embodiments of this disclosure. The following omits repeated descriptions when describing the apparatuses shown in FIG. 9 to FIG. 11.

Figure 9:
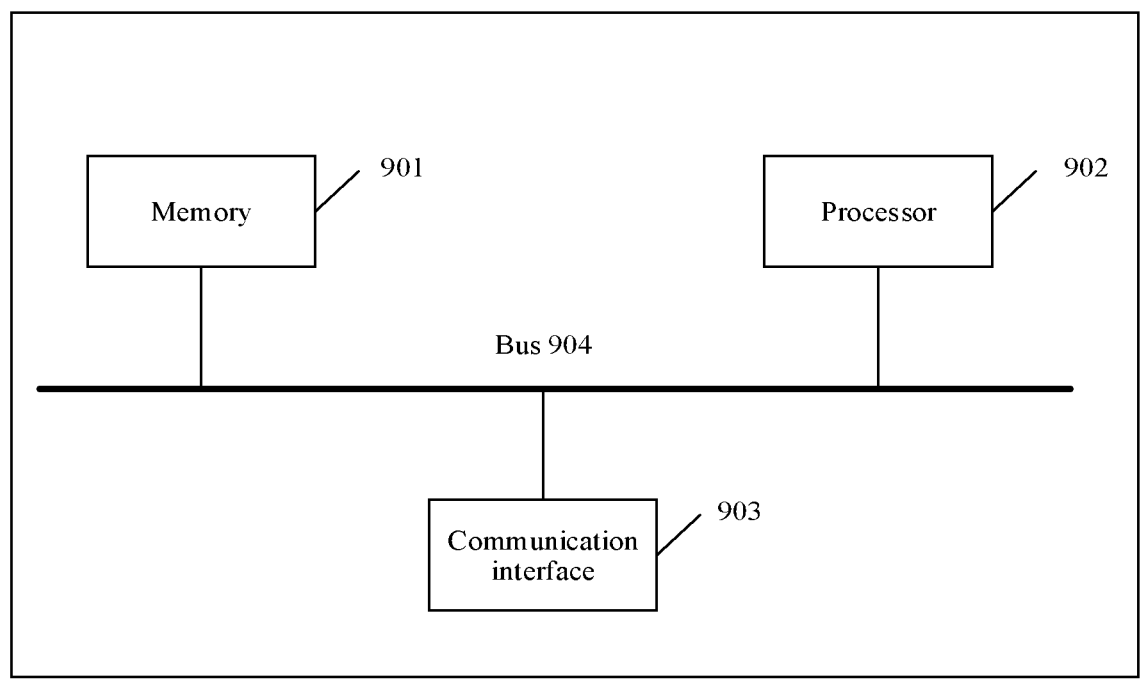
FIG. 9 is a schematic block diagram of a processing apparatus according to an embodiment of this disclosure.

FIG. 9 is a schematic diagram of a structure of a processing apparatus according to an embodiment of this disclosure. The processing apparatus shown in FIG. 9 includes a memory 901, a processor 902, a communication interface 903, and a bus 904. A communication connection between the memory 901, the processor 902, and the communication interface 903 is implemented by using the bus 904.

FIG. 9 is a schematic diagram of a hardware structure of a processing apparatus according to an embodiment of this disclosure. The processing apparatus shown in FIG. 9 includes a memory 901, a processor 902, a communication interface 903, and a bus 904. A communication connection between the memory 901, the processor 902, and the communication interface 903 is implemented by using the bus 904.

The memory 901 may store a program. When executing the program stored in the memory 901, the processor 902 is configured to perform steps of the processing method in embodiments of this disclosure.

The processor 902 may be a general-purpose CPU, a microprocessor, an ASIC, a Graphics processing unit (GPU), or one or more integrated circuits, and is configured to execute a related program, to implement the processing method in embodiments of this disclosure.

Alternatively, the processor 902 may be an integrated circuit chip, and has a signal processing capability. In an implementation process, steps of the processing method (for example, the method shown in FIG. 7) in embodiments of this disclosure may be completed by using a hardware integrated logic circuit or an instruction in a form of software in the processor 902.

It should be understood that a neural network is trained by using the processing apparatus shown in FIG. 9, and a trained neural network may be used to perform the object detection method in embodiments of this disclosure.

Figure 10:
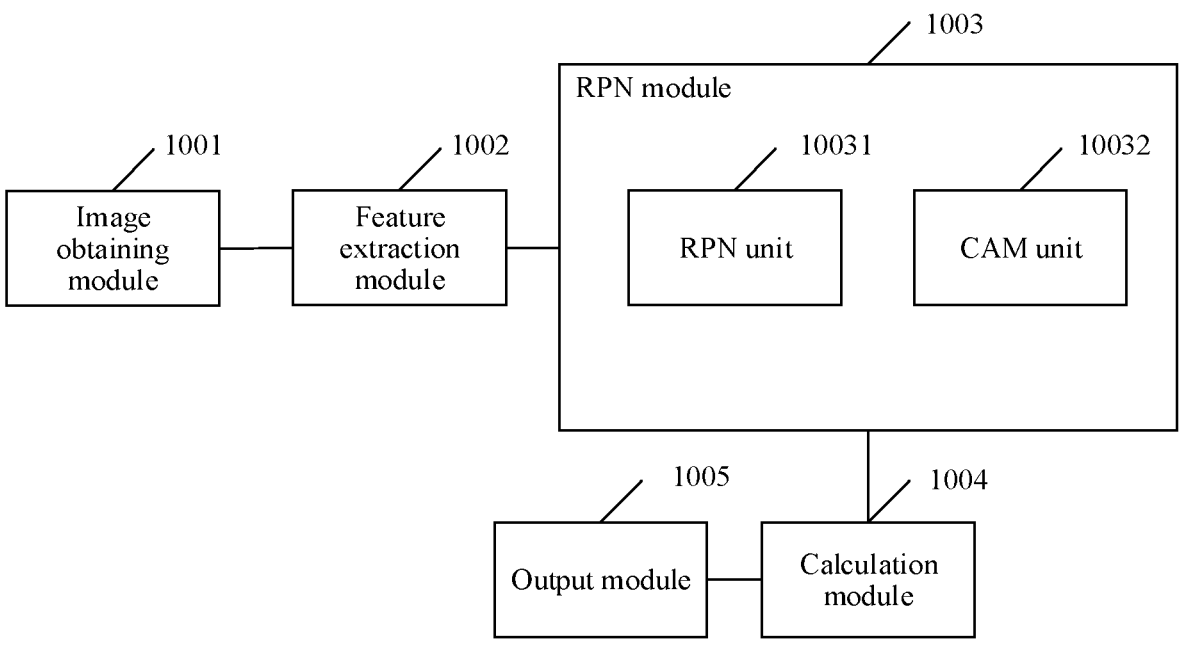
FIG. 10 is a schematic block diagram of an object detection apparatus according to an embodiment of this disclosure.

FIG. 10 is a schematic block diagram of an object detection apparatus according to an embodiment of this disclosure. The object detection apparatus shown in FIG. 10 includes an image obtaining module 1001 configured to perform Step 1 in the embodiment corresponding to FIG. 8, a feature extraction module 1002 configured to perform Step 2 in the embodiment corresponding to FIG. 8, an RPN module 1003, where the RPN module 1003 may include an RPN unit 10031 and a CAM unit 10032, the RPN unit 10031 is configured to perform Step 3 in the embodiment corresponding to FIG. 8, the CAM unit 10032 is configured to perform Step 4 in the embodiment corresponding to FIG. 8, and the RPN module 1003 is configured to perform Step 5 in the embodiment corresponding to FIG. 8, a calculation module 1004 configured to perform Step 6 to Step 8 in the embodiment corresponding to FIG. 8, and an output module 1005 configured to perform Step 9 in the embodiment corresponding to FIG. 8.

Figure 11:
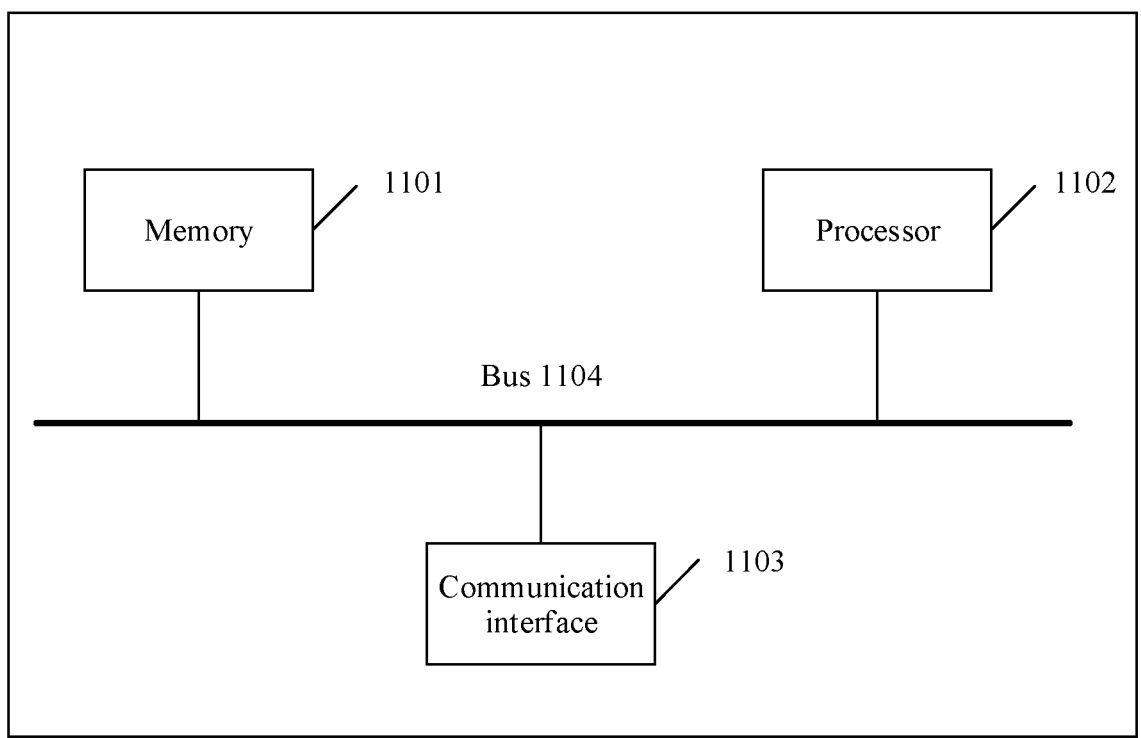
FIG. 11 is a schematic block diagram of an object detection apparatus according to an embodiment of this disclosure.

FIG. 11 is a schematic block diagram of an object detection apparatus according to an embodiment of this disclosure. The object detection apparatus in FIG. 11 may also be referred to as a processing apparatus. The object detection apparatus shown in FIG. 11 includes a memory 1101, a processor 1102, a communication interface 1103, and a bus 1104. A communication connection between the memory 1101, the processor 1102, and the communication interface 1103 is implemented by using the bus 1104.

The memory 1101 may be a read-only memory (ROM), a static storage device, a dynamic storage device, or a RAM. The memory 1101 may store a program. When executing the program stored in the memory 1101, the processor 1102 and the communication interface 1103 are configured to perform steps of the object detection method in embodiments of this disclosure. Further, the communication interface 1103 may obtain a to-be-detected image from the memory or another device, and then the processor 1102 performs object detection on the to-be-detected image.

The processor 1102 may use a general-purpose CPU, a microprocessor, an ASIC, a GPU, or one or more integrated circuits, and is configured to execute a related program, to implement a function that needs to be executed by a module in the object detection apparatus in this embodiment of this disclosure, or to perform the object detection method in embodiments of this disclosure.

Alternatively, the processor 1102 may be an integrated circuit chip, and has a signal processing capability. In an implementation process, the steps of the object detection method in embodiments of this disclosure may be completed by using a hardware integrated logic circuit or an instruction in a form of software in the processor 1102.

The processor 1102 may alternatively be a general-purpose processor, a digital signal processor (DSP), an ASIC, an FPGA or another programmable logic device, a discrete gate or transistor logic device, or a discrete hardware component. The foregoing general-purpose processor may be a microprocessor, or the processor may be any conventional processor or the like. The steps in the methods disclosed with reference to embodiments of this disclosure may be directly performed and completed by a hardware decoding processor, or may be performed and completed by using a combination of hardware in the decoding processor and a software module. The software module may be located in a mature storage medium in the art, such as a RAM, a flash memory, a ROM, a programmable ROM (PROM), an electrically erasable PROM (EEPROM), or a register. The storage medium is located in the memory 1101. The processor 1102 reads information in the memory 1101, and completes, in combination with hardware of the processor 1102, a function that needs to be executed by a module included in the object detection apparatus in this embodiment of this disclosure, or performs the object detection method in the method embodiments of this disclosure.

The communication interface 1103 uses a transceiver apparatus, for example but not for limitation, a transceiver, to implement communication between the apparatus module and another device or a communication network. For example, a to-be-processed image may be obtained through the communication interface 1103.

The bus 1104 may include a path for transmitting information between the components (for example, the memory 1101, the processor 1102, and the communication interface 1103) of the apparatus module.

It should be noted that, although only the memory, the processor, and the communication interface are shown in the apparatus module and the apparatus, in a specific implementation process, a person skilled in the art should understand that the apparatus module and the apparatus each may further include another component necessary for normal running. In addition, based on a specific requirement, a person skilled in the art should understand that the apparatus module and the apparatus each may further include a hardware component for implementing another additional function. In addition, a person skilled in the art should understand that the apparatus module and the apparatus each may include only components necessary for implementing embodiments of this disclosure, but not necessarily include all the components shown in FIG. 10 and FIG. 11.

A person of ordinary skill in the art may be aware that, in combination with the examples described in embodiments disclosed in this specification, modules and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this disclosure, it should be understood that the disclosed system, apparatus, and method may be implemented in another manner. For example, the described apparatus embodiment is merely an example. For example, division into modules is merely logical function division and may be another division manner during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected based on an actual requirement to achieve objectives of the solutions of the embodiments.

In addition, functional modules in this disclosure may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A processing apparatus comprising:
a collection system comprising a processor, wherein the processor is configured to obtain a first image comprising:
   a second image comprising:
      an instance-level label;
      a class label; and
      a bounding box of an object; and
   a third image comprising:
      an image-level label; and
      the class label; and a training system comprising:
   a convolutional neural network configured to output, based on the first image, a feature map of the first image;
   a region proposal network (RPN) layer coupled to the convolutional neural network, comprising a plurality of convolutional layers and a class activation map (CAM) component, and configured to:
      determine, based on the feature map, a proposal region of the first image;
      determine, using the CAM component, a CAM corresponding to the proposal region, wherein the CAM indicates a CAM response intensity of the proposal region;
      determine, based on a weighted sum of a confidence of the proposal region and the CAM response intensity, a probability that the proposal region belongs to a foreground; and
      determine, based on the probability, a feature of the proposal region; and
   a plurality of heads, wherein each head is coupled to the RPN layer and configured to compute, based on the feature of the proposal region, multiple instance detection (MID) losses of the second image with the instance-level label and MID losses of the third image with the image-level label to train an object detection model.

2. The processing apparatus of claim 1, wherein the processor is further configured to:
receive the second image; and
obtain, based on the class label, the third image.

3. The processing apparatus of claim 1, wherein the CAM response intensity is directly proportional to the probability.

4. The processing apparatus of claim 1, wherein the CAM response intensity is based on a CAM heat map.

5. The processing apparatus of claim 1, wherein the MID loss determines a parameter of the training system.

6. The processing apparatus of claim 5, wherein the heads are coupled in series.

7. The processing apparatus of claim 5, wherein the RPN layer is further configured to calculate CAM losses of the second image and the third image, and wherein each of the CAM losses determines the parameter.

8. The processing apparatus of claim 7, wherein the RPN layer is further configured to calculate an RPN loss of the second image, wherein each of the N heads is further configured to calculate a proposal loss of the second image, a classification loss of the second image, and a regression loss of the second image, and wherein the RPN loss, the proposal loss, the classification loss, and the regression loss determine the parameter.

9. The processing apparatus of claim 1, wherein the processing apparatus is a cloud server.

10. An object detection apparatus comprising:
a convolutional neural network configured to:
   receive a to-be-detected image; and
   output a feature map of the to-be-detected image;
a region proposal network (RPN) layer coupled to the convolutional neural network, comprising a plurality of convolutional layers and a class activation map (CAM) component, and configured to:
   determine, based on the feature map, a proposal region of the to-be-detected image;
   determine, using the CAM component, a CAM corresponding to the proposal region, wherein the CAM indicates a CAM response intensity of the proposal region;

determine, based on a weighted sum of a confidence of the proposal region and the CAM response intensity, a probability that the proposal region belongs to a foreground; and determine, based on the probability, a feature of the proposal region; and a plurality of heads, wherein each head is coupled to the RPN layer and configured to compute, based on the feature of the proposal region, multiple instance detection (MID) losses associated with the second image having the instance-level label and MID losses of the third image having the image-level label, to train an object detection model.

11. The object detection apparatus of claim 10, wherein the CAM response intensity is directly proportional to the probability.

12. The object detection apparatus of claim 10, wherein the CAM response intensity is based on a CAM heat map.

13. The object detection apparatus of claim 10, wherein any one of the heads is further configured to output, based on the probability, a detection result comprising a class of an object and a bounding box of the object.

14. The object detection apparatus of claim 13, wherein the heads are coupled in series.

15. A processing method, comprising:

obtaining, by a collection system of a processing apparatus, a first image, wherein the first image comprises a second image and a third image, wherein the second image comprises an instance-level label, a class label, and a bounding box of an object, and wherein the third image comprises an image-level label and the class label;

outputting, by a convolutional neural network (CNN) of a training system of the processing apparatus and based on the first image, a feature map of the first image;

determining, by a region proposal network (RPN) layer of the training system and based on the feature map, a proposal region of the first image;

determining a class activation map (CAM) corresponding to the proposal region, wherein the CAM indicates a CAM response intensity of the proposal region;

determining, based on a weighted sum of a confidence of the proposal region and the CAM response intensity, a probability that the proposal region belongs to a foreground;

determining, based on the probability, a feature of the proposal region; and computing, by a plurality of heads coupled to the RPN layer and based on the feature of the proposal region, multiple instance detection (MID) losses associated with the second image having the instance-level label and MID losses of the third image having the image-level label to train an object detection model.

16. The processing method of claim 15, further comprising:

receiving the second image; and obtaining, based on the class label, the third image.

17. The processing method of claim 15, wherein the CAM response intensity is directly proportional to the probability.

18. The processing method of claim 15, wherein the CAM response intensity is based on a CAM heat map of the proposal region.

19. The processing method of claim 15, wherein each of the MID losses determines a parameter of a training system.

20. The processing method of claim 19, further comprising calculating CAM losses of the second image and the third image, wherein each of the CAM losses determines the parameter.

21. The processing method of claim 20, further comprising:

calculating a region proposal network (RPN) loss of the second image; and calculating a proposal loss of the second image, a classification loss of the second image, and a regression loss of the second image, wherein the RPN loss, the proposal loss, the classification loss, and the regression loss determine the parameter.

22. An object detection method, comprising:

receiving, by a convolutional neural network (CNN) of a training system of a processing apparatus, a to-be-detected image from a collection system of the processing apparatus;

outputting a feature map of the to-be-detected image;

determining, by a region proposal network (RPN) layer of the training system and based on the feature map, a proposal region of the to-be-detected image;

determining a class activation map (CAM) corresponding to the proposal region, wherein the CAM indicates a CAM response intensity of the proposal region; and determining, based on a weighted sum of a confidence of the proposal region and the CAM response intensity, a probability that the proposal region belongs to a foreground;

determining, based on the probability, a feature of the proposal region; and computing, by a plurality of heads coupled to the RPN layer and based on the feature of the proposal region, multiple instance detection (MID) losses associated with the second image having the instance-level label and MID losses of the third image having the image-level label to train an object detection model.

23. The object detection method of claim 22, wherein the CAM response intensity is directly proportional to the probability.

24. The object detection method of claim 22, wherein the CAM response intensity is based on a CAM heat map.

25. The object detection method of claim 22, further comprising outputting, based on the probability, a detection result comprising a class of an object and a bounding box of the object.

* * * * *